(12) United States Patent
Bagley

(10) Patent No.: US 12,018,716 B2
(45) Date of Patent: Jun. 25, 2024

(54) BEARING ASSEMBLIES, RELATED BEARING APPARATUSES AND RELATED METHODS

(71) Applicant: US SYNTHETIC CORPORATION, Orem, UT (US)

(72) Inventor: Ronald Daniel Bagley, Pittsburgh, PA (US)

(73) Assignee: US Synthetic Cor poration, Orem, UT (US)

( * ) Notice: Subject to any disclaimer, the term of this patent is extended or adjusted under 35 U.S.C. 154(b) by 223 days.

(21) Appl. No.: 17/587,734

(22) Filed: Jan. 28, 2022

(65) Prior Publication Data

US 2022/0213926 A1 Jul. 7, 2022

Related U.S. Application Data

(63) Continuation of application No. 16/644,383, filed as application No. PCT/US2019/037191 on Jun. 14, 2019, now Pat. No. 11,268,570.
(Continued)

(51) Int. Cl.
*F16C 17/24* (2006.01)
*E21B 4/00* (2006.01)
(Continued)

(52) U.S. Cl.
CPC ............ *F16C 17/243* (2013.01); *E21B 4/003* (2013.01); *F16C 17/04* (2013.01); *F16C 33/043* (2013.01);
(Continued)

(58) Field of Classification Search
CPC ...... F16C 17/04; F16C 17/243; F16C 33/043; F16C 33/1025; F16C 33/1045;
(Continued)

(56) References Cited

U.S. PATENT DOCUMENTS 5,590,729 A 1/1997 Cooley et al.
7,552,782 B1 6/2009 Sexton et al.
(Continued)

FOREIGN PATENT DOCUMENTS

CA 3064424 A1 12/2018
CA 2849165 C 8/2019
(Continued)

OTHER PUBLICATIONS

International Search Report and Written Opinion from International Application No. PCT/US2019/037191 dated Aug. 29, 2019.
(Continued)

*Primary Examiner* — Alan B Waits
(74) *Attorney, Agent, or Firm* — BKRIP LLC

(57) ABSTRACT

Embodiments disclosed herein are directed to bearing assemblies, related bearing apparatuses, and related methods. An example of a bearing assembly disclosed herein may include a support structure having a first end and a second end. The bearing assembly also includes a superhard bearing element secured to the first end of the support structure. The superhard bearing element includes a superhard sealing surface that may be configured to contact a sealing surface of an opposing bearing element, a base surface contacting the support structure and opposing the superhard sealing surface, and at least one lateral surface extending between the superhard sealing surface and the base surface. The support structure and the superhard bearing element may both include at least one conduit extending therethrough through which a fluid may flow.

20 Claims, 14 Drawing Sheets

Related U.S. Application Data

(60) Provisional application No. 62/687,044, filed on Jun. 19, 2018.

(51) Int. Cl.
    *F16C 17/04*           (2006.01)
    *F16C 33/04*           (2006.01)
    *F16C 37/00*           (2006.01)

(52) U.S. Cl.
    CPC .......... *F16C 37/00* (2013.01); *F16C 2206/04* (2013.01); *F16C 2352/00* (2013.01)

(58) Field of Classification Search
    CPC .... F16C 33/1055; F16C 33/108; F16C 33/26; F16C 37/00; F16C 2206/04; F16C 2352/00; E21B 4/003
    See application file for complete search history.

(56) References Cited

U.S. PATENT DOCUMENTS

| | | | |
|---|---|---|---|
| 7,866,418 B2 | 1/2011 | Bertagnolli et al. | |
| 8,297,382 B2 | 10/2012 | Bertagnolli et al. | |
| 8,672,550 B1 | 3/2014 | Peterson et al. | |
| 8,789,281 B1 * | 7/2014 | Sexton | E21B 4/02 |
| | | | 29/898.041 |
| 9,004,768 B1 * | 4/2015 | Peterson | F16C 33/26 |
| | | | 384/316 |
| 9,062,505 B2 | 6/2015 | Crockett et al. | |
| 9,080,601 B1 | 7/2015 | Peterson | |
| 9,315,881 B2 | 4/2016 | Linford et al. | |
| 9,346,149 B1 | 5/2016 | Linford et al. | |
| 2010/0284637 A1 | 11/2010 | Sentmanat | |
| 2011/0067929 A1 * | 3/2011 | Mukhopadhyay | E21B 10/5735 |
| | | | 51/307 |
| 2012/0080230 A1 | 4/2012 | Flores et al. | |
| 2014/0348452 A1 | 11/2014 | Gonzalez et al. | |
| 2015/0152915 A1 | 6/2015 | Peterson | |
| 2016/0327088 A1 * | 11/2016 | Peterson | F16C 33/043 |

FOREIGN PATENT DOCUMENTS

| | | |
|---|---|---|
| CN | 105538173 A | 5/2016 |
| JP | 08334004 A | 12/1996 |
| WO | 2013148465 A1 | 10/2013 |
| WO | 2017034788 A1 | 3/2017 |

OTHER PUBLICATIONS

Non-Final Office Action for U.S. Appl. No. 16/644,383 dated Jul. 8, 2021.
Notice of Allowance for U.S. Appl. No. 16/644,383 dated Nov. 1, 2021.
U.S. Appl. No. 13/734,354, filed Jan. 4, 2013.
U.S. Appl. No. 61/948,970, filed Mar. 6, 2014.
U.S. Appl. No. 62/002,001, filed May 22, 2014.
U.S. Appl. No. 62/687,044, filed Jun. 19, 2018.

\* cited by examiner

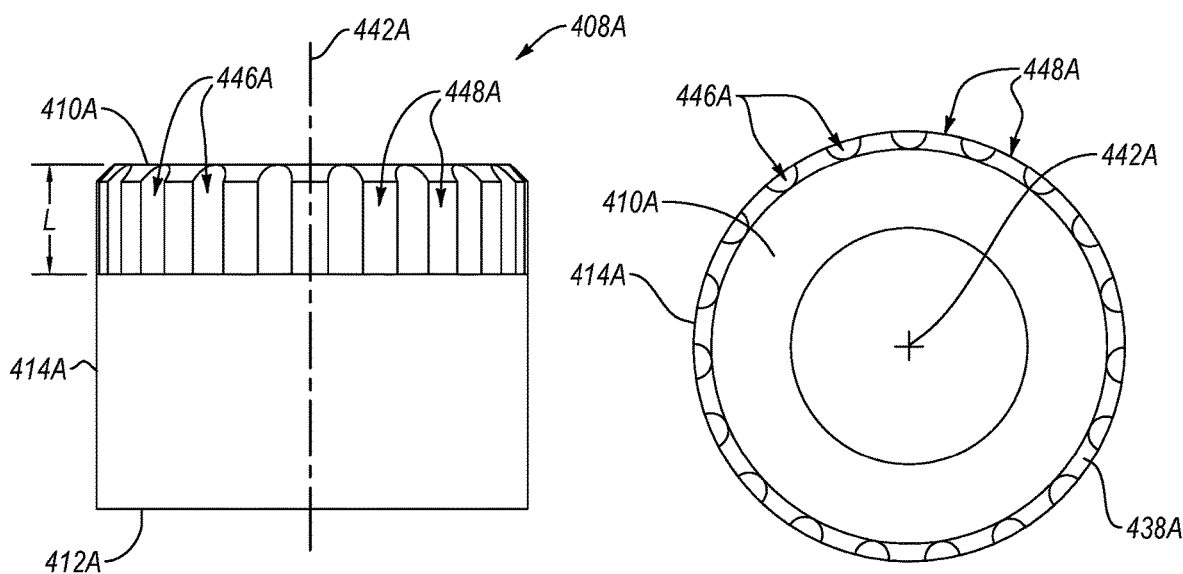
FIG. 4A
FIG. 4B
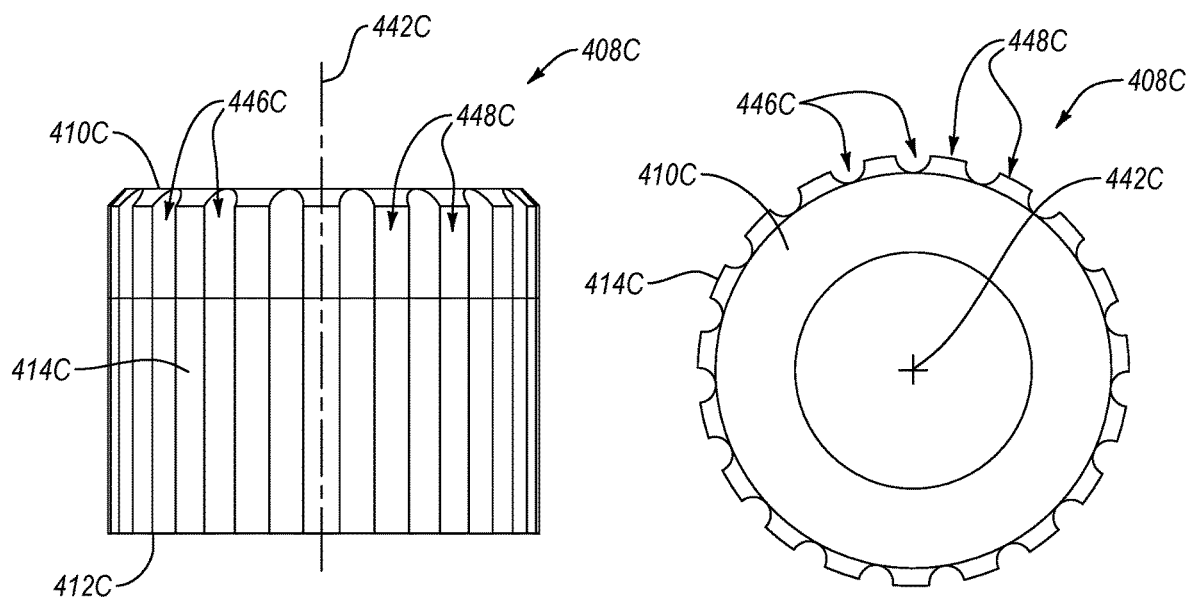
FIG. 4C
FIG. 4D

BEARING ASSEMBLIES, RELATED BEARING APPARATUSES AND RELATED METHODS

CROSS-REFERENCE TO RELATED APPLICATIONS

This application is a continuation of U.S. patent application Ser. No. 16/644,383 filed 4 Mar. 2020 which is a U.S. Nationalization of PCT International Application No. PCT/US2019/037191 filed on 14 Jun. 2019, which claims priority to U.S. Provisional Application No. 62/684,044 filed on 19 Jun. 2018, the disclosure of each of the foregoing applications which is incorporated herein, in its entirety, by this reference.

BACKGROUND

Wear-resistant, superhard compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs and other superhard compacts have found particular utility as superhard bearing elements in thrust bearings within pumps, turbines, subterranean drilling systems, motors, compressors, generators, gearboxes, and other systems and apparatuses. For example, a PDC bearing element typically includes a superhard diamond layer that is commonly referred to as a diamond table. The diamond table is formed and bonded to a substrate using a high-pressure/high-temperature ("HPHT") process.

Despite the availability of a number of different bearing apparatuses including such PDCs and/or other superhard materials, manufacturers and users of bearing apparatuses continue to seek bearing apparatuses that exhibit improved performance characteristics, lower cost, or both.

SUMMARY

Embodiments disclosed herein are directed to bearing assemblies, related bearing apparatuses, and related methods. In an embodiment, a bearing assembly is disclosed. The bearing assembly includes a support structure having a first end and a second end. The support structure defines a support structure conduit extending from the second end to the first end. The bearing assembly also includes a superhard bearing element secured to the support structure. The superhard bearing element includes a superhard sealing surface, a base surface, at least one lateral surface extending between the superhard sealing surface and the base surface, at least one interior surface extending between the superhard sealing surface to the base surface, and a plurality of fins. The at least one interior surface defines a bearing element conduit coupled to the support structure conduit. The plurality of fins are separated from each other by a plurality of grooves formed in at least one of the at least one lateral surface, the interior surface, or the support structure.

In an embodiment, a bearing assembly is disclosed. The bearing assembly includes a support structure having a first end and a second end. The support structure defines a support structure conduit extending from the second end to the first end. The bearing assembly also includes a superhard bearing element secured to the support structure. The superhard bearing element includes an at least partially leached polycrystalline diamond table defining a superhard sealing surface. The at least partially leached polycrystalline diamond table includes a leached region extending inwardly from the superhard sealing surface. The superhard bearing elements also includes a base surface, at least one lateral surface extending between the superhard sealing surface and the base surface, and at least one interior surface extending between the superhard sealing surface to the base surface. The at least one interior surface defines a bearing element conduit coupled to the support structure conduit.

In an embodiment, a bearing assembly is disclosed. The bearing assembly includes a support structure having a first end and a second end. The support structure defines a support structure conduit extending from the second end to the first end. The support structure defines a recess at the first end thereof. The bearing assembly also includes a superhard bearing element at least partially disposed in and press-fit or brazed in the recess. The superhard bearing element includes a superhard sealing surface, a base surface, at least one lateral surface extending between the superhard sealing surface and the base surface, and at least one interior surface extending between the superhard sealing surface to the base surface. The at least one interior surface defines a bearing element conduit coupled to the support structure conduit.

In an embodiment, a bearing assembly is disclosed. The bearing assembly includes a support structure having a first end and a second end. The support structure defines a support structure conduit extending from the second end to the first end. The bearing assembly also includes a superhard bearing element secured to the support structure. The superhard bearing element includes a superhard sealing surface exhibiting a surface roughness, in root mean square, of about 5 μm to about 40 μm, a base surface, at least one lateral surface extending between the superhard sealing surface and the base surface, and at least one interior surface extending between the superhard sealing surface to the base surface. The at least one interior surface defines a bearing element conduit coupled to the support structure conduit.

In an embodiment, a bearing apparatus is disclosed. The bearing apparatus includes a stator bearing assembly and a rotor bearing assembly that contacts and is configured to rotate relative to the stator bearing assembly. At least one of the stator bearing assembly or the rotor bearing assembly is any one of the bearing assemblies disclosed herein.

In an embodiment, a method of operating a bearing apparatus is disclosed. The method includes rotating a rotor bearing assembly relative to a stator bearing assembly. The rotor bearing assembly includes a rotor support structure and a rotor bearing element secured to the rotor support structure. The stator bearing assembly includes a stator support structure and a stator bearing element secured to the stator support structure. The rotor bearing element includes a first superhard sealing surface and the stator bearing element including a second superhard sealing surface. The first superhard sealing surface contacts and the second superhard sealing surface. The method also includes flowing a fluid through each of a stator support structure conduit defined by at least one inner support structure surface of the stator support structure, a stator bearing element conduit that is defined by at least one stator interior surface of the second superhard bearing element, a rotor support structure conduit defined by at least one inner support structure surface of the rotor support structure, and a rotor bearing element conduit that is defined by at least one rotor interior surface of the first superhard bearing element. The stator bearing element conduit extends between the second superhard sealing surface and the stator base surface and the rotor bearing element conduit extends between the first superhard sealing surface and the rotor base surface.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

FIGS. 4A and 4B are a side view and a top plan view of a superhard bearing element shown with respect to a central axis, according to an embodiment.

FIGS. 4C and 4D are a side view and a top plan view of a superhard bearing element shown with respect to a central axis, according to an embodiment.

DETAILED DESCRIPTION

Figure 1A:
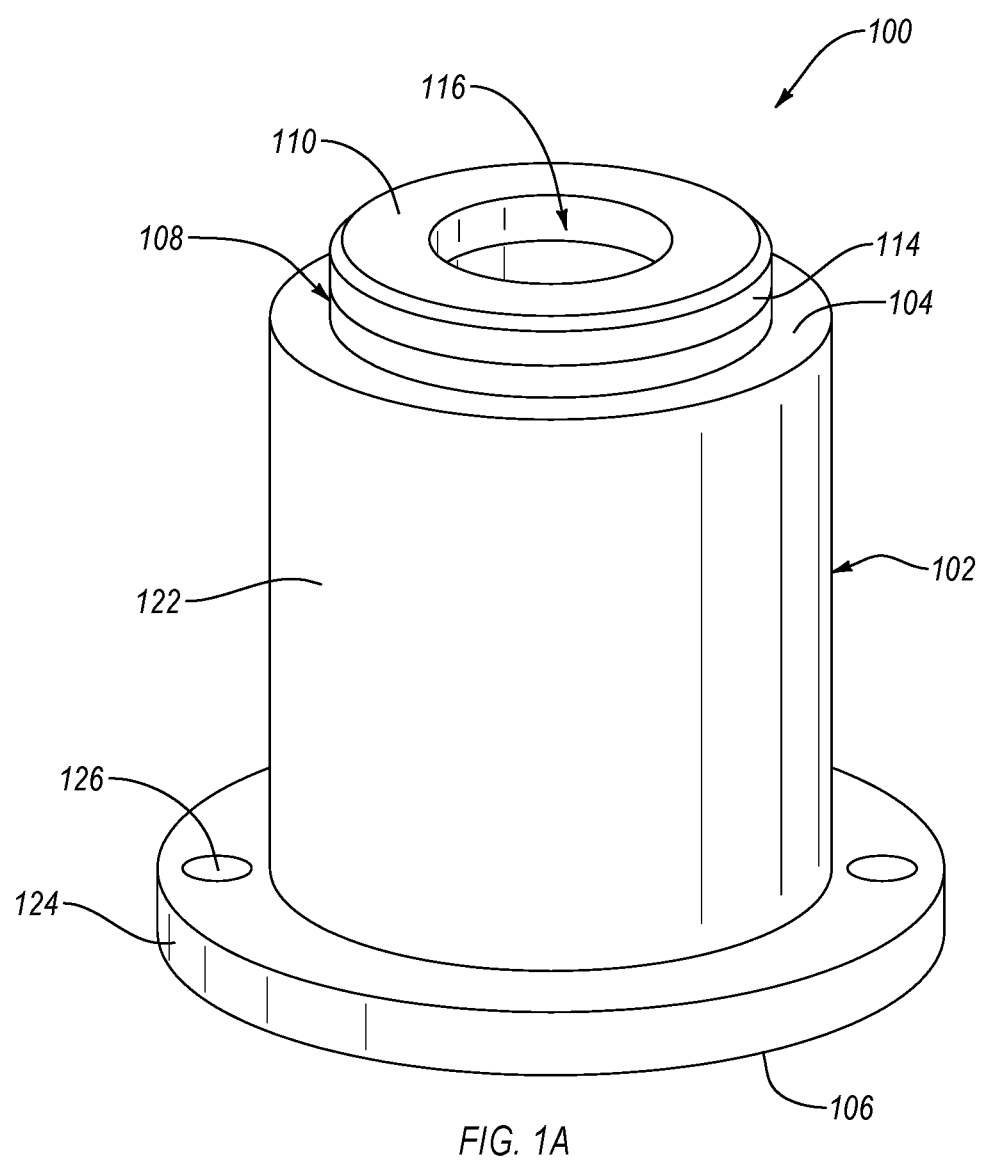
FIGS. 1A and 1B are an isometric and schematic cross-sectional views, respectively, of a bearing assembly, according to an embodiment.

Embodiments disclosed herein are directed to bearing assemblies, related bearing apparatuses (e.g., rotary union bearing apparatuses), and related methods. In one or more embodiments, a bearing assembly may include a support structure having a first end and a second end. The bearing assembly also includes a superhard bearing element secured to the first end of the support structure. The superhard bearing element includes a superhard sealing surface that may be configured to contact a sealing surface of an opposing bearing element, a base surface contacting the support structure and opposing the superhard sealing surface, and at least one lateral surface extending between the superhard sealing surface and the base surface. The support structure and the superhard bearing element may both include at least one conduit extending therethrough through which a fluid may flow. For example, the support structure may include a support structure conduit extending from the second end towards the first end and the superhard bearing element may include a bearing element conduit extending therethrough. The bearing element conduit may be defined by at least one interior surface of the bearing element that extends between the superhard sealing surface and the base surface. The support structure conduit and the bearing element conduit are coupled together thereby enabling a fluid to flow through the bearing assembly.

The bearing assemblies disclosed herein may be used in a bearing apparatus. The bearing apparatus may include a stator bearing assembly and a rotor bearing assembly that is configured to rotate relative to the stator bearing assembly. In an embodiment, both the stator bearing assembly and the rotor bearing assembly may include a support structure and a superhard bearing element secured to the support structure. Each of the superhard bearing elements of the stator bearing assembly and the rotor bearing assembly may include superhard sealing surfaces that are configured to contact each other. The stator bearing assembly and the rotor bearing assembly may each have at least one conduit extending therethrough. The conduits of the stator bearing assembly and the rotor bearing assembly may be coupled together and configured to allow a fluid to flow between the stator bearing assembly and the rotor bearing assembly, even when the rotor bearing assembly is rotating relative to the stator bearing assembly. In an embodiment, the superhard sealing surfaces of the stator bearing assembly and the rotor bearing assembly can substantially limit or prevent the fluid flowing between the stator bearing assembly and the rotor bearing assembly from leaking from the conduits.

Due to the conduits of the bearing assemblies disclosed herein, the bearing assemblies and related bearing apparatuses may be used in rotary unions. However, the bearing assemblies and related bearing apparatuses disclosed herein may be an improvement over conventional rotary unions. For example, conventional rotary unions including non-superhard sealing surfaces may not adequately prevent fluids from leaking between the non-superhard sealing surfaces thereof, especially after long periods of operation. As such, conventional rotary unions may use of O-rings or other sealing devices to prevent the fluid from leaking from the rotary union. However, the use of O-rings and other sealing devices may at least one of increase the complexity of the rotary union, exhibit short life spans, increase friction between the rotating and stationary components of the rotary union thereby increasing the energy required to use the rotary union, or increase the size of the rotary union. However, the bearing assemblies and bearing apparatuses disclosed herein do not require the use of O-rings or other sealing devices because, as previously discussed, the superhard sealing surfaces thereof may substantially prevent or limit a fluid from leaking between the superhard sealing surfaces thereof.

In an embodiment, substantially preventing or limiting the fluid from leaking between the superhard sealing surfaces may cause the bearing assemblies and bearing apparatuses disclosed herein to generate significant amounts of heat during operation. For example, allowing the fluid to leak between the superhard sealing surfaces can cause the superhard sealing surfaces to transfer heat to the fluid and/or the fluid can form a thin fluid film which limits or prevents the superhard sealing surfaces from contacting each other. However, preventing or limiting the fluid from leaking between the superhard sealing surfaces may cause the superhard sealing surfaces to directly contact each other during operation which may generate heat. The heat generated during operation of the bearing assemblies and bearing apparatuses disclosed herein may cause damage to the bearing assemblies and bearing apparatuses disclosed herein. As such, as will be discussed in more detail below, the bearing assemblies and bearing apparatuses disclosed herein may include thermal management features that at least one of may improve cooling of the superhard bearing elements, limit the amount of heat generated by the superhard bearing elements, or improve the thermal resistance of the bearing assemblies and bearing apparatuses.

Figure 1B:
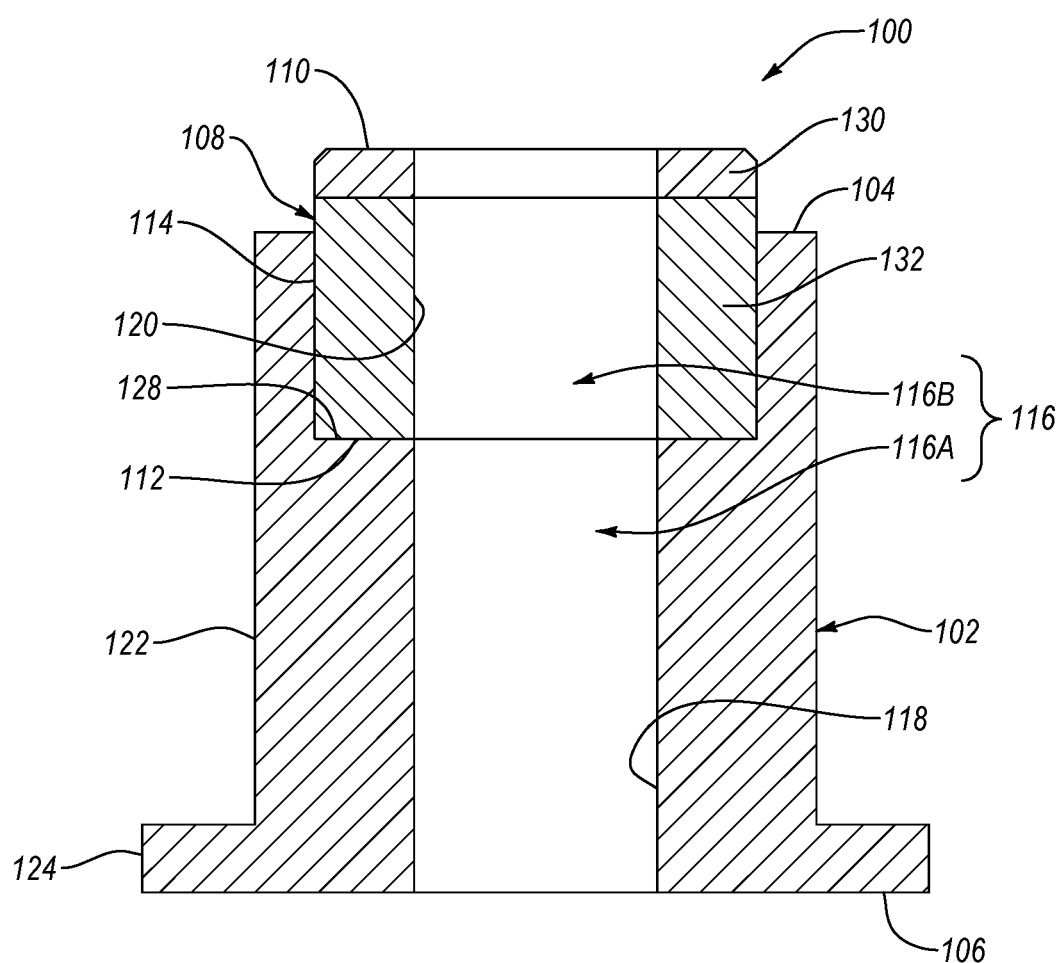

FIGS. 1A and 1B are isometric and schematic cross-sectional views, respectively, of a bearing assembly 100, according to an embodiment. The bearing assembly 100 includes a support structure 102 that includes a first end 104 and a second end 106. The bearing assembly 100 also includes a superhard bearing element 108 secured to the support structure 102. The superhard bearing element 108 include a superhard sealing surface 110, a base surface 112 (shown in FIG. 1B) that opposes the superhard sealing surface 110, and at least one lateral surface 114 extend between the superhard sealing surface 110 and the base surface 112.

The support structure 102 and the superhard bearing element 108 collectively define at least one conduit 116 extending through the bearing assembly 100. The conduit 116 allows fluid to flow through the bearing assembly 100. Referring to FIG. 1B, the at least one conduit 116 includes a support structure conduit 116A and a bearing element conduit 116B. The support structure conduit 116A may extend from the second end 106 of the support structure 102 generally towards the first end 104 of the support structure 102. For example, the support structure 102 may include a support structure interior surface 118 that extends from the second end 106 generally towards the first end 104. The support structure interior surface 118 may define the support structure conduit 116A. The bearing element conduit 116B may extend from superhard sealing surface 110 to the base surface 112 of the superhard bearing element 108. For example, the superhard bearing element 108 may include a bearing element interior surface 120 that extends between the superhard sealing surface 110 and the base surface 112. The bearing element interior surface 120 may define the bearing element conduit 116B.

The support structure conduit 116A and the bearing element conduit 116B may be positioned such that a fluid flowing through the support structure conduit 116A can also communicate or flow through the bearing element conduit 116B, and vice versa. In an embodiment, the support structure conduit 116A and the bearing element conduit 116B may exhibit substantially the same size and shape and be positioned such that the support structure interior surface 118 and the bearing element interior surface 120 are substantially aligned, continuous, and/or congruent with each other. In such an embodiment, the conduit 116 may include substantially no recesses, ridges, protrusions, etc. at the intersection of the support structure conduit 116A and the bearing element conduit 116B which can impede fluid flow through the conduit 116. In another embodiment, the support structure conduit 116A and the bearing element conduit 116B may be sized and positioned such that the support structure interior surface 118 and the bearing element interior surface 120 are incongruent, misaligned, and/or discontinuous with each other. For example, the support structure conduit 116A may exhibit a size or shape that is different than the bearing element conduit 116B and/or the support structure conduit 116A and the bearing element conduit 116B are not positioned to be congruent with each other. In such an embodiment, the conduit 116 may include recesses, ridges, protrusion, etc. which can slow or otherwise impede the flow of a fluid through the conduit 116.

In an embodiment, one or more of the support structure conduit 116A or the bearing element conduit 116B may exhibit a diameter or lateral dimension that is greater than about 1 mm, greater than about 2 mm, greater than about 5 mm, greater than about 10 mm, greater than about 15 mm, or in ranges of about 1 mm to about 2 mm, about 1.5 mm to about 3 mm, about 2 mm to about 4 mm, about 2.5 mm to about 5 mm, about 4 mm to about 6 mm, about 5 mm to about 7.5, about 6 mm to about 8 mm, about 7.5 mm to about 10 mm, about 8 mm to about 12 mm, or about 10 mm to about 15 mm. The diameter of the support structure conduit 116A and/or the bearing element conduit 116B may depend on one or more of the amount of fluid expected to flow through the conduit 116, the expected pressure to be applied between the superhard sealing surface 110 and an opposing sealing surface, the diameter of the superhard bearing element 108, the diameter of the support structure 102, or other factors. In an embodiment, the support structure conduit 116A and the bearing element conduit 116B may exhibit the same diameter. In such an embodiment, the intersection of the support structure conduit 116A and the bearing element conduit 116B may not impede the flow of the fluid. In an embodiment, the support structure conduit 116A and the bearing element conduit 116B exhibit different diameters. In such an embodiment, the intersection of the support structure conduit 116A and the bearing element conduit 116B may impede the flow of the fluid.

The support structure 102 may exhibit any suitable shape that is sufficient to enable the superhard bearing element 108 secured thereto and define the support structure conduit 116A extending therethrough. In an embodiment, the support structure 102 may exhibit a shape that generally corresponds to the shape of the conduit 116. For example, the support structure 102 may exhibit a generally cylindrical shape. In an embodiment, the support structure 102 may include a first portion 122 extending from the first end 104 and a second portion 124 extending from the second end 106 towards the first portion 122. The first portion 122 may exhibit an elongated or non-elongated shape. The first portion 122 may exhibit a first diameter that is larger than the support structure conduit 116A. As such, the support structure conduit 116A may extend through the first portion 122. The second portion 124 may exhibit a second diameter or lateral dimension that is greater than the first diameter or lateral dimension of the first portion 122. The larger second diameter of the second portion 124 may facilitate attachment of the bearing assembly 100 to another component. For example, the second portion 124 may define holes 126 (FIG. 1A) therein that may enable the bearing assembly 100 to be attached to another component (e.g., with screws or other suitable fastener).

The superhard bearing element 108 may exhibit a diameter or lateral dimension that is greater than the diameter or lateral dimension of the bearing element conduit 116B. For example, the superhard bearing element 108 can exhibit a diameter or lateral dimension that is greater than about 2 mm, greater than about 5 mm, greater than about 7.5 mm, greater than about 10 mm, greater than about 25 mm, greater than about 50 mm, greater than about 75 mm, greater than about 100 mm, greater than about 125 mm, greater than about 150 mm, greater than about 200 mm, greater than about 200 mm, or in ranges of about 2 mm to about 5 mm, about 2.5 mm to about 7.5 mm, about 5 mm to about 10 mm, about 7.5 mm to about 15 mm, about 10 mm to about 25 mm, about 20 mm to about 50 mm, about 25 mm to about 75 mm, about 50 mm to about 100 mm, about 75 mm to about 150 mm, or about 100 mm to about 200 mm. In an embodiment, the diameter of the superhard bearing element 108 is at least about 1.5× greater (e.g., at least about 2× greater, at least about 3× greater, or at least about 5× greater) than the diameter of the bearing element conduit 116B. In such an embodiment, the superhard sealing surface 110 may exhibit a suitable surface area to support thrust loads applied thereto during operation.

The support structure conduit 116A and the bearing element conduit 116B may be formed in the support structure 102 and the superhard bearing element 108, respectively, using a variety of techniques. In an embodiment, the support structure conduit 116A and/or the bearing element conduit 116B may be formed by electrical discharge machining (e.g., plunge electrical discharge machining and/or wire electrical discharge machining), drilling, laser drilling, other suitable techniques, or combinations thereof. In an embodiment, the support structure 102 may be casted, molded, or otherwise formed to include the support structure conduit 116A. In an embodiment, at least one of the support structure 102 or the superhard bearing element 108 includes a sacrificial material substantially defining the support structure conduit 116A or the bearing element conduit 116B. For example, at least one the support structure 102 or the superhard bearing element 108 may be formed by laterally surrounding a sacrificial material (e.g., tungsten, tungsten carbide, hexagonal boron nitride, combinations thereof) with a material (e.g., particles or sintered, solid material) and then forming the support structure 102 or the superhard bearing element 108 using a suitable technique (e.g., an HPHT process). After forming the support structure 102 or the superhard bearing element 108, the sacrificial material may be removed therefrom.

The superhard bearing element 108 may be secured to the support structure 102 using any suitable method. For example, the first end 104 of the support structure 102 may define a recess 128 therein. The recess 128 may generally correspond to the size and shape of the superhard bearing element 108. In an embodiment, the superhard bearing element 108 may be at least partially disposed in and secured to the recess 128. For example, the superhard bearing element 108 may be brazed to the recess 128. In another example, the superhard bearing element 108 may be press-fit into the recess 128 (with any acceptable interference fit, without limitation).

The support structure 102 may include one or more materials or combinations of materials. For example, the support structure 102 may include a metal, alloy steel, a metal alloy, carbon steel, stainless steel, tungsten carbide, other suitable conductive materials, other suitable non-conductive materials, or combinations thereof. In any event, the support structure 102 may include a suitable material having sufficient mechanical properties (e.g., strength and resilience) to support the superhard bearing element 108.

The superhard bearing element 108 may include one or more superhard materials. The term "superhard" means a material having a hardness at least equal to the hardness of tungsten carbide. In an embodiment, the superhard bearing element 108 may include polycrystalline cubic boron nitride, polycrystalline diamond (e.g., formed by chemical vapor deposition or by HPHT sintering), diamond crystals, silicon carbide, silicon nitride, tantalum carbide, tungsten carbide (e.g., binderless tungsten carbide, cobalt-cemented tungsten carbide), boron carbide, other metal carbides, other superhard ceramic carbides, or combinations thereof. In another embodiment, each of the superhard bearing element 108 may comprise reaction-bonded silicon carbide or reaction-bonded silicon nitride. The reaction-bonded silicon carbide or reaction-bonded silicon nitride may have additional materials therein. For example, the additional materials in the reaction-bonded superhard ceramic may include diamond, polycrystalline diamond, cubic boron nitride, a material exhibiting a hardness greater than the reaction-bonded ceramic or a material exhibiting a thermal conductivity greater than the reaction-bonded ceramic. Adding materials to the reaction-bonded ceramic comprising the superhard bearing element 108 may increase the thermal conductivity and/or wear resistance of the superhard bearing element 108. For example, adding diamond particles to reaction-bonded silicon carbide or reaction-bonded silicon nitride may increase the wear resistance of the superhard bearing element 108 by more than 500%. In an embodiment, diamond may be added to the reaction-bonded ceramic in an amount less that about 80 weight % (e.g., about 80 weight % to about 50 weight %, about 50 weight % to about 25 weight %, less than about 25 weight %). Suitable reaction-bonded ceramics are commercially available from M Cubed Technologies, Inc. of Newark, Delaware. In an embodiment, the superhard bearing element 108 may be formed from a single material.

As shown in FIG. 1B, the superhard bearing element 108 may include a superhard table 130 defining the superhard sealing surface 110 and a substrate 132 to which the superhard table 130 is bonded. In an embodiment, the superhard bearing element 108 may comprise a polycrystalline diamond compact ("PDC") includes a polycrystalline diamond ("PCD") table defining the superhard table 130 to which the substrate 132 is bonded. For example, the substrate 132 may comprise a cobalt-cemented tungsten carbide substrate bonded to a PCD table. The PCD table includes a plurality of directly bonded-together diamond grains exhibiting diamond-to-diamond bonding therebetween (e.g., $sp^3$ bonding), which define a plurality of interstitial regions. A portion of, or substantially all of, the interstitial regions of the PCD table may include a metal-solvent catalyst or a metallic interstitial constituent disposed therein that is infiltrated from the substrate 132 or infiltrated or provided from another source (e.g., mixed with diamond particles prior to HPHT sintering) during fabrication. For example, the metal-solvent catalyst or metallic interstitial constituent may be selected from iron, nickel, cobalt, and alloys of the foregoing. As will be discussed in more detail below, the PCD table may further include leached diamond in which the metal-solvent catalyst or metallic interstitial constituent has been partially or substantially completely depleted from a selected surface or volume of the PCD table, such as via a leaching process. PCD may also be sintered with one or more alkali metal or a alkaline earth metal catalysts (e.g., alkali metal or alkaline earth metal carbonates).

In an embodiment, the PDC may be formed in an HPHT process. For example, diamond particles may be disposed adjacent to the substrate 132, and subjected to an HPHT process to sinter the diamond particles to form the PCD table and bond the PCD table to the substrate 132, thereby forming the PDC. The temperature of the HPHT process may be at least about 1000° C. (e.g., about 1200° C. to about 1600° C.) and the cell pressure of the HPHT process may be at least 4.0 GPa (e.g., about 5 GPa to about 12 GPa or about 7.5 GPa to about 11 GPa) for a time sufficient to sinter the diamond particles.

The diamond particles may exhibit an average particle size of about 50 μm or less, such as about 30 μm or less, about 20 μm or less, about 10 μm to about 18 μm, or about 15 μm to about 18 μm. In some embodiments, the average particle size of the diamond particles may be about 10 μm or less, such as about 2 μm to about 5 μm or submicron. In some embodiments, the diamond particles may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the mass of diamond particles may include a portion exhibiting a relatively larger size (e.g., 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and 4 μm. In some embodiments, the diamond particles may comprise three or more different sizes (e.g., one relatively larger size and two or more relatively smaller sizes), without limitation. The PCD table so-formed after sintering may exhibit an average diamond grain size that is the same or similar to any of the foregoing diamond particle sizes and distributions.

More details about diamond particle sizes and diamond particle size distributions that may be employed are disclosed in U.S. Pat. No. 9,346,149; U.S. Provisional Patent Application No. 61/948,970; and U.S. Provisional Patent Application No. 62/002,001. Each of U.S. patent application Ser. No. 13/734,354; U.S. Provisional Patent Application No. 61/948,970; and U.S. Provisional Patent Application No. 62/002,001 is incorporated herein, in its entirety, by this reference. Further, additional examples of PDCs and PCD tables and methods to form the PDCs and the PCD tables that may be employed in any of the embodiments disclosed herein are disclosed in U.S. Pat. Nos. 7,866,418, 8,297,382, and 9,315,881, the disclosure of each of which are incorporated herein, in its entirety, by this reference.

In an embodiment, the superhard table 130 may be integrally formed with the substrate 132. For example, the superhard table 130 may be a sintered PCD table that is integrally formed with or upon the substrate 132. In such an embodiment, the infiltrated metal-solvent catalyst from the substrate 132 may be used to catalyze formation of diamond-to-diamond bonding between diamond grains of the superhard table 130 from diamond powder during HPHT processing. In another embodiment, the superhard table 130 may be a pre-formed superhard table that has been HPHT bonded to the substrate 132 in a second HPHT process after being initially formed in a first HPHT process. For example, the superhard table 130 may be a pre-formed PCD table that has been at least partially leached to substantially completely remove the metal-solvent catalyst used in the manufacture thereof and subsequently HPHT bonded or brazed to the substrate 132 in a separate process.

The substrate 132 may be formed from any number of different materials, and may be integrally formed with, or otherwise bonded or connected to, the superhard table 130. Materials suitable for the substrate 132 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in an embodiment, the substrate 132 comprises cobalt-cemented tungsten carbide. However, in certain embodiments, the superhard table 130 may be omitted, and the superhard bearing element 108 may be made from a superhard material, such as cobalt-cemented tungsten carbide. In other embodiments, the substrate 132 may be omitted and the superhard bearing element 108 may be a superhard material, such as a polycrystalline diamond body that has been at least partially leached to deplete the metal-solvent catalyst therefrom or may be an un-leached PCD body.

In another embodiment, the superhard material of the superhard bearing element 108 may be a superhard coating that forms the superhard sealing surface 110. The coating may be formed using a chemical vapor deposition technique, a physical vapor deposition technique, or any other deposition technique. For example, diamond may be deposited on a less hard surface to form the superhard sealing surface 110 using a chemical or physical vapor deposition technique.

The superhard sealing surface 110 may include a relatively smooth surface which can substantially prevent leaks across the superhard sealing surface 110. For example, contacting the superhard sealing surface 110 against an opposing sealing surface substantially prevent or limit fluid flowing between the superhard sealing surface 110 and the opposing sealing surface because of the relatively smooth surface of the superhard sealing surface 110. The superhard sealing surface 110 may maintain the relatively smooth surface thereof during operation for long periods of time because the superhard sealing surface 110 includes a superhard material. The superhard sealing surface 110 may exhibit a relatively smooth surface when the superhard sealing surface 110 exhibits a surface roughness (in root mean square) that is less than about 100 such as less than or less than 50 It is noted that the opposing sealing surface may also include a relatively smooth surface thereby further preventing or limiting fluid flow the superhard sealing surface 110 and the opposing sealing surface.

However, as previously discussed, substantially preventing fluids from leaking across the superhard sealing surface 110 may cause the superhard bearing element 108 to generate heat during operation. The heat generated by the superhard sealing surface 110 may be generated by friction. To limit heat generated by superhard sealing surface 110, in an embodiment, the superhard sealing surface 110 may exhibit a relatively smooth surface finish. In other words, the relatively smooth surface finish of the superhard sealing surface 110 may be a thermal management feature of the bearing assembly 100 since it may reduce the amount of heat generated by the superhard bearing element 108 during operation. In an embodiment, the relatively smooth surface finish includes a surface roughness that is less than about 40 µm. As such, the superhard sealing surface 110 may exhibit a surface roughness, in root mean square, that is less than about 40 µm, less than about 30 µm, less than about 20 µm, less than about 10 µm, less than about 5 µm, less than about 1 µm, submicron, about 5 µm to about 40 µm, about 5 µm to about 20 µm, about 10 µm to about 30 µm, or about 20 µm to about 40 µm. The superhard sealing surface 110 may maintain the relatively smooth surface finish for long periods of time because the superhard sealing surface 110 includes a superhard material. It is noted that the opposing sealing surface may also include a relatively smooth surface finish thereby further reducing the amount of heat generated during operation.

The superhard sealing surface 110 may be processed to exhibit a relatively smooth surface finish using any suitable method. In an embodiment, the superhard sealing surface 110 may be smoothed by polishing, lapping, grinding, lasing the superhard sealing surface 110, or combinations thereof.

Figure 2A:
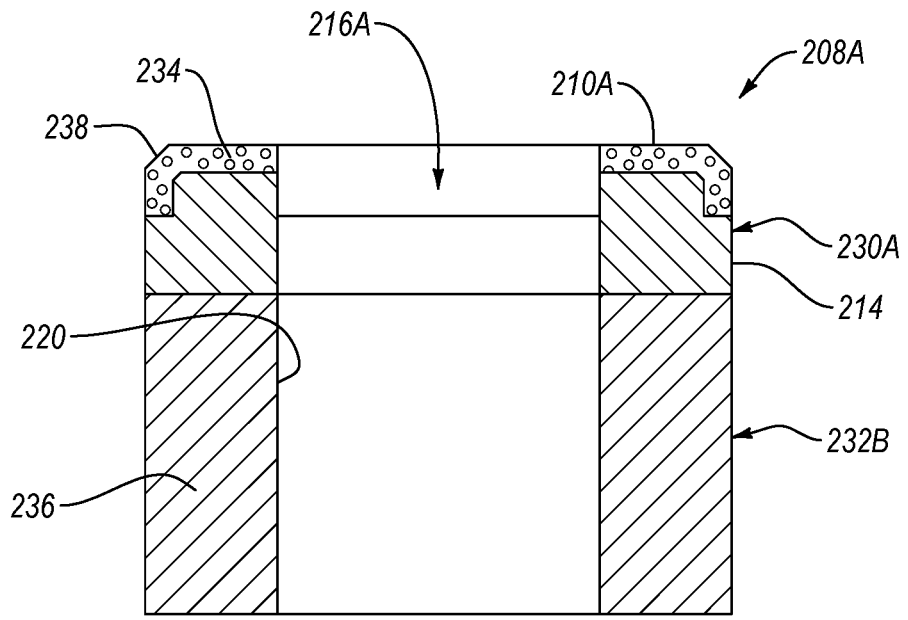
FIG. 2A is a cross-sectional view of a superhard bearing element, according to an embodiment.

FIG. 2A is a cross-sectional view of a superhard bearing element 208A, according to an embodiment. In an embodiment, at least one feature of the superhard bearing element 208A may be the same as or substantially similar to at least one feature of any of the superhard bearing elements disclosed herein. For example, the superhard bearing element 208A may include a superhard table 230A, a substrate 232A, and a conduit 216A. Further, the superhard bearing element 208A may be used in any of the bearing assemblies or bearing apparatuses disclosed herein.

The superhard table 230A may include a plurality of superhard particles that are bonded together. The superhard particles may define a plurality of interstitial regions that are at least partially occupied by an interstitial constituent. For example, the interstitial constituent may include a metal-solvent catalyst when the superhard particles includes diamond grains. In an embodiment, the superhard table 230A may be at least partially leached to deplete the interstitial constituent therefrom in order to enhance the thermal stability of the superhard table 230A. Leaching the superhard table 230A may form a leached region 234 that had at least some of the interstitial constituent removed therefrom and an unleached region 236 adjacent to the substrate 232A that was not leached. The unleached region 236 may cause the superhard table 230A to remain securely bonded to the substrate 232A and prevent damage to the substrate 232A. The leached region 234 may be a thermal management feature of the superhard bearing element 208A. For example, the superhard bearing element 208A may include a PCD table bonded to the substrate 232A. The PCD table may include a metal-solvent catalyst (e.g., iron, nickel, cobalt, or alloys thereof) or another suitable catalyst disposed in the interstitial regions thereof. The metal-solvent catalyst may reduce the thermal stability of the PCD table. As such, the metal-solvent catalyst may be removed from a portion of the PCD table thereby improving the thermal stability thereof. It is noted that the superhard table 230A may be leached even when the superhard bearing element 208A includes one or more thermal management features.

The leached region 234 may extend inwardly from at least the superhard sealing surface 210A of the superhard bearing element 208A to a selected depth. In an embodiment, the depth of the leached region 234 may be about 20 µm to about 600 µm, about 400 µm to about 1200 µm, about 400 µm to about 800 µm, about 600 µm to about 1000 µm, or greater than about 1000 µm.

Typically, the superhard table 230A is leached by immersing at least a portion of the superhard table 230A in a leaching solution. The leaching solution may include any suitable acid, such as aqua regia, nitric acid, hydrofluoric acid, or mixture thereof. In an embodiment, the leached region 234 may extend inwardly to a depth (e.g., generally uniform depth or variable depth) from one or more surfaces of the superhard table 230A that contacts the leaching solution. As such, the superhard table 230A may be configured to exhibit a selected leached profile (e.g., the leached region 234 exhibits a selected shape) depending on which surfaces of the superhard table 230A are exposed to the leaching solution. In an embodiment, only the superhard sealing surface 210A is exposed to the leaching solution and, as such, the leached region 234 may extend inwardly from the superhard sealing surface 210A. In an embodiment, the superhard sealing surface 210A and a portion of at least one lateral surface 214 of the superhard table 230A is exposed to the leaching solution. In such an embodiment, the leached region 234 may extend inwardly from the superhard sealing surface 210A and the lateral surface 214. In an embodiment, the superhard table 230A may include a chamfer 238 that was formed in the superhard table 230A before the superhard table 230A was leached. In such an embodiment, the leached region 234A may extend inwardly from the chamfer 238 to a leach depth along with any other surface of the superhard table 230A that was exposed to the leaching solution. In an embodiment, the superhard table 230A may include a chamfer 238 that is formed in the superhard table 230A after the superhard table 230A leached. In such an embodiment, the depth and/or shape of the portions of the leached region 234 at or near the chamfer 238 may be affected.

In an embodiment, the superhard table 230A is leached after forming the conduit 216A therein. The conduit 216 is defined by an interior surface 220 of the superhard bearing element 208A. In such an embodiment, a portion of the leached region 234 may extend inwardly from a portion of the interior surface 220 that is spaced from the substrate 232A for the selected depth along with any other surface of the superhard table 230A that was exposed to the leaching solution. For example, the portions of the superhard table 230A adjacent to the bearing element interior surface 220 may exhibit relatively high temperature during operation. As such, leaching the superhard table 230A such that the leached region 234 extends inwardly from at least a portion of the bearing element interior surface 220 may inhibit thermal damage to the superhard table 230A.

Figure 2B:
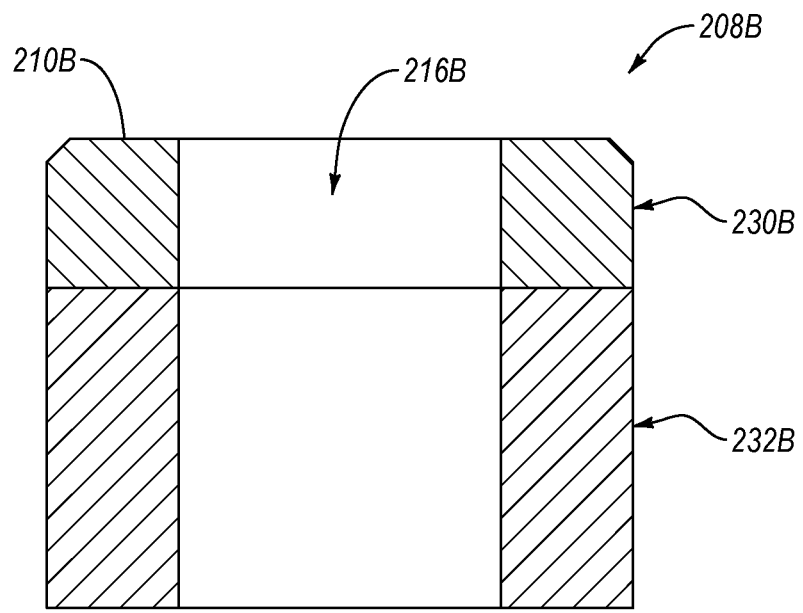
FIG. 2B is a cross-sectional view of a superhard bearing element, according to an embodiment.

FIG. 2B is a schematic cross-sectional view of a superhard bearing element 208B, according to an embodiment. In an embodiment, at least one feature of the superhard bearing element 208B may be the same as or substantially similar to at least one feature of any of the superhard bearing elements disclosed herein. For example, the superhard bearing element 208B may include a superhard table 230B defining a superhard sealing surface 210B, a substrate 232B, and a conduit 216B. Further, the superhard bearing element 208B may be used in any of the bearing assemblies or bearing apparatuses disclosed herein.

The superhard bearing element 208B includes a plurality of superhard particles defining a plurality of interstitial regions. At least a portion of the interstitial regions of the superhard bearing element 208B includes an interstitial constituent disposed therein. However, the superhard table 230A is not leached (i.e., does not include a leached region). In an embodiment, the superhard bearing element 208B may include one or more thermal management features that make leaching the superhard table 230B unnecessary.

Figure 3A:
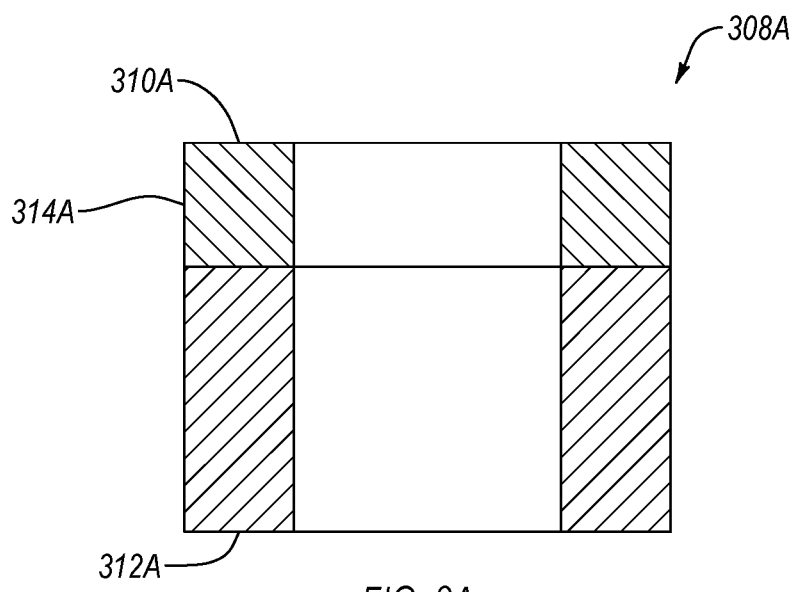
FIGS. 3A to 3C are cross-sectional views of different superhard bearing elements, according to different embodiments.
Figure 3B:
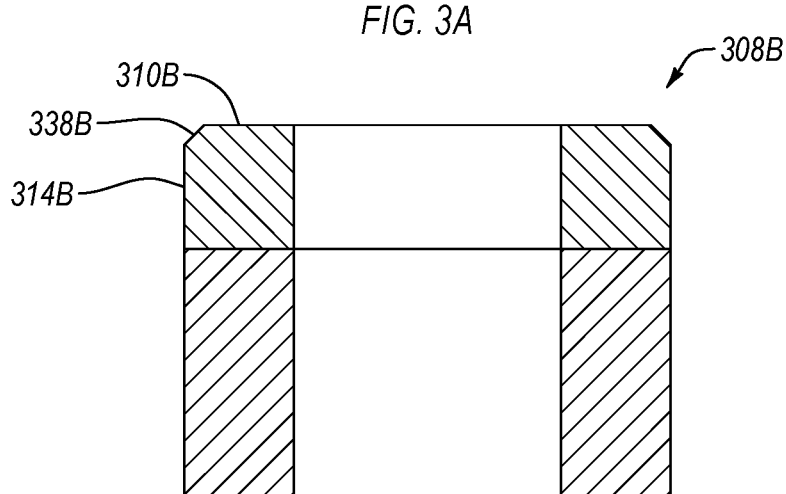
Figure 3C:
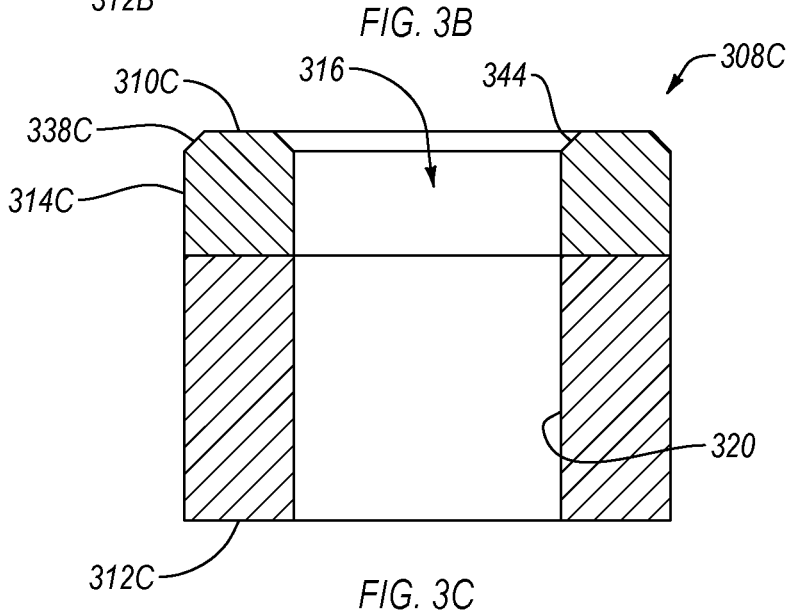

FIGS. 3A to 3C are schematic cross-sectional views of different superhard bearing elements, according to different embodiments. In an embodiment, at least one of the features of the superhard bearing elements illustrated in FIGS. 3A-3C may be the same as or substantially similar to at least one feature of any of the superhard bearing elements disclosed herein. For example, each of the superhard bearing elements illustrated in FIGS. 3A-3C may include a superhard table, a substrate, and a conduit. Further, the superhard bearing elements illustrated in FIGS. 3A-3C may be used in any of the bearing assemblies or bearing apparatuses disclosed herein.

Referring to FIG. 3A, a superhard bearing element 308A includes a superhard sealing surface 310A, an base surface 312A, and at least one lateral surface 314A extending from the base surface 312A to the superhard sealing surface 310A. The superhard sealing surface 310A and the lateral surface 314A may intersect with each other substantially at a right angle. However, configuring the superhard sealing surface 310A and the lateral surface 314A to intersect substantially at a right angle may cause the superhard bearing element 308A to be damages under certain conditions during operation.

Referring to FIG. 3B, a superhard bearing element 308B includes a superhard sealing surface 310B, an base surface 312B, and at least one lateral surface 314B extending from the base surface 312B towards the superhard sealing surface 310B. The superhard bearing element 308B also includes a chamfer 338B extending between the superhard sealing surface 310B and the lateral surface 314B. The chamfer 338B may prevent or reduce damage to of the superhard bearing element 308B during operation. It is noted that the superhard bearing element 308B may include a curved surface or another suitable surface instead of the chamfer 338B.

Referring to FIG. 3C, a superhard bearing element 308C includes a bearing element interior surface 320 that defines a conduit 316. The superhard bearing element 308C may include an interior chamfer 344 extending between the interior surface 320 and the superhard sealing surface 310C. The interior surface 320 may extend from the interior chamber 344 of the superhard bearing element 308C to a base surface 312C of the superhard bearing element 308C. The interior chamfer 344 may reduce damage to the superhard bearing element 308C during operation and/or facilitate fluid flow between the conduit 316 and the conduit of an opposing bearing element. Further, the interior chamfer 344 may form a thermal management feature of the superhard bearing element 308C because the interior chamfer 344 increases the surface area of the superhard bearing element 308C that is exposed to the fluid flowing through the conduit 316 thereby increasing the amount of heat that may be transferred to the fluid. The superhard bearing element 308C may also include an exterior chamfer 338C extending between the lateral surface 314C and the superhard sealing surface 310C.

In an embodiment, the one or more thermal management features of any of the superhard bearing elements disclosed may include a plurality of fins formed in or coupled to at least a portion of the lateral surface or the bearing element interior surface thereof. For example, the plurality of fins of the superhard bearing elements may increase the surface area of the superhard bearing elements that are at least one of exposed to an environment (e.g., a gas, solid, or liquid) about the bearing element, exposed to a fluid flow (e.g., a gas or liquid) around or through the superhard bearing element, or contact the support structure. The increased surface area of superhard bearing elements created by the plurality of fins can increase the amount of heat that is transferred from the superhard bearing element into at least one of the environment, the fluid, or the support structure. The increased amount of heat transferred from the superhard bearing element can decrease the temperature of the superhard bearing element during operation.

Figure 4E:
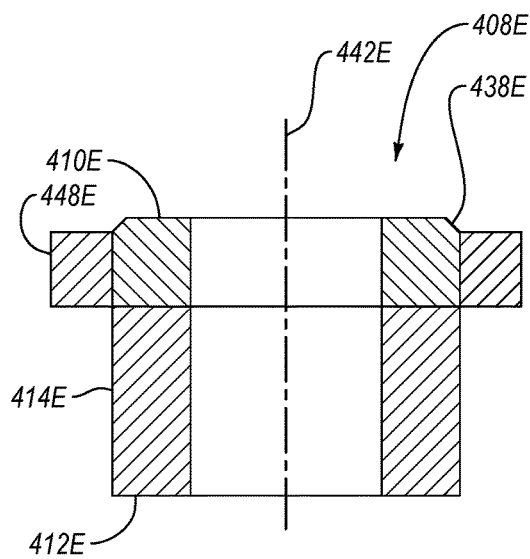
FIGS. 4E and 4F are a side view and a top plan view of a superhard bearing element shown with respect to a central axis, according to an embodiment.
Figure 4F:
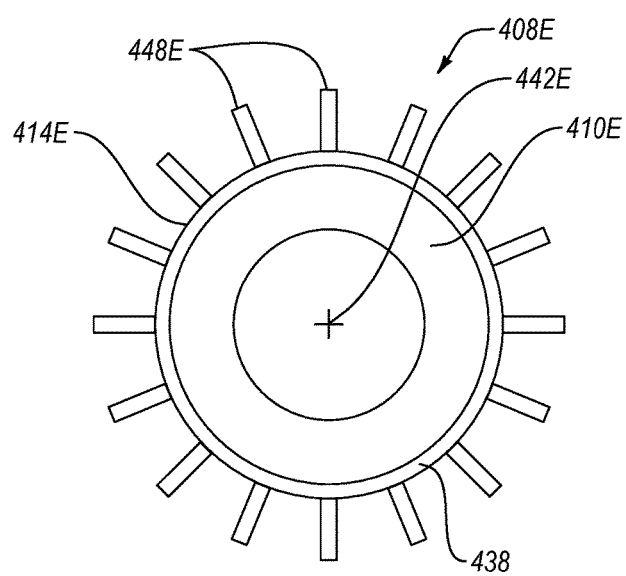
Figure 4G:
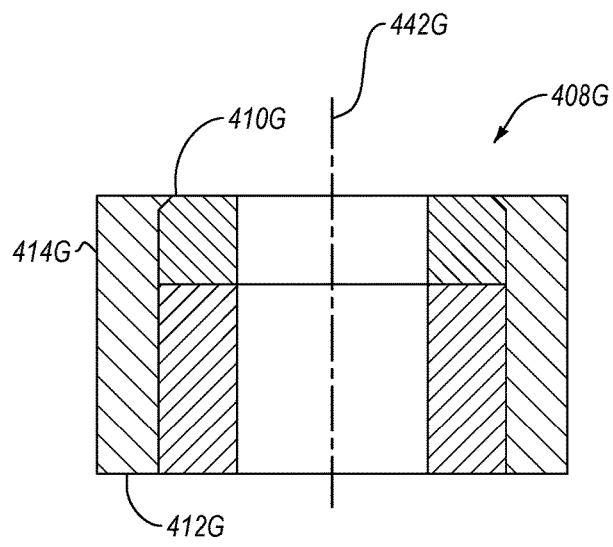
FIGS. 4G and 4H are a side view and a top plan view of a superhard bearing element shown with respect to a central axis, according to an embodiment.
Figure 4H:
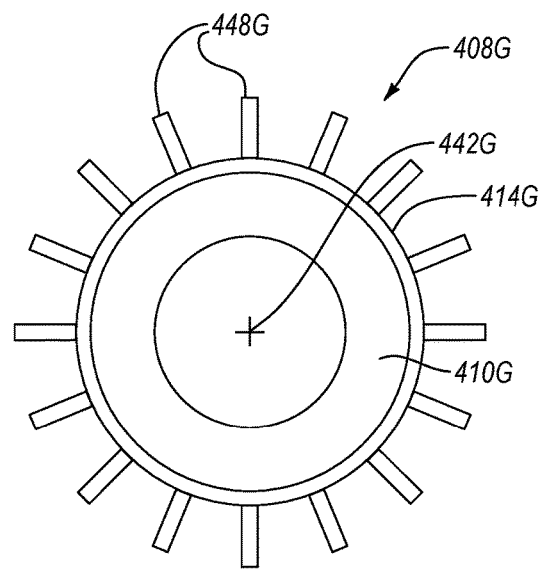
Figure 4I:
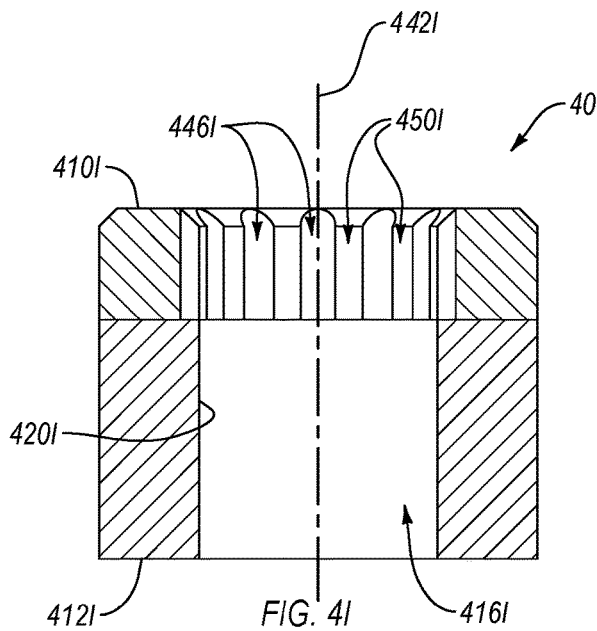
FIGS. 4I and 4J are a side cross-sectional view and a top plan view of a superhard bearing element shown with respect to a central axis, according to an embodiment.
Figure 4J:
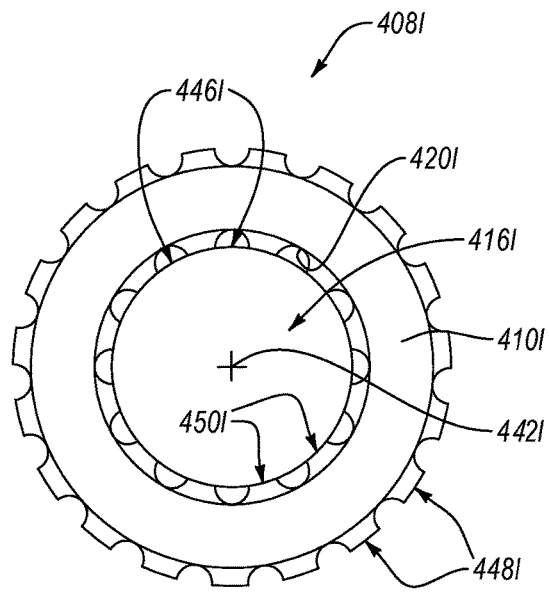
Figure 4K:
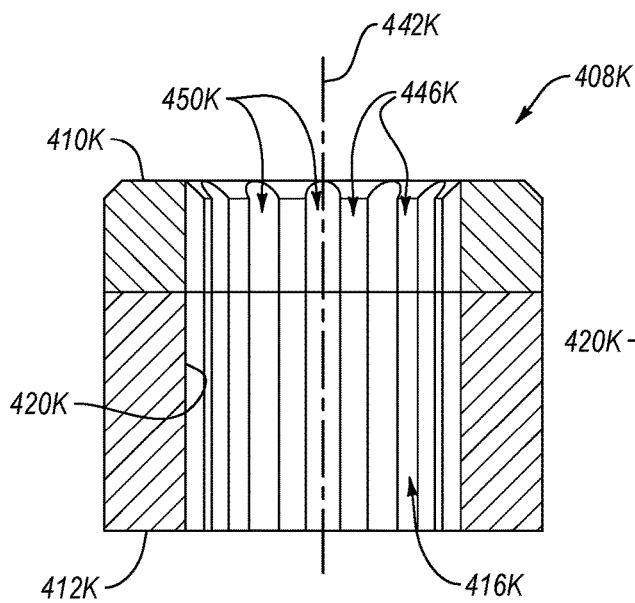
FIGS. 4K and 4L are a side view and a top plan view of a superhard bearing element shown with respect to a central axis, according to an embodiment.
Figure 4L:
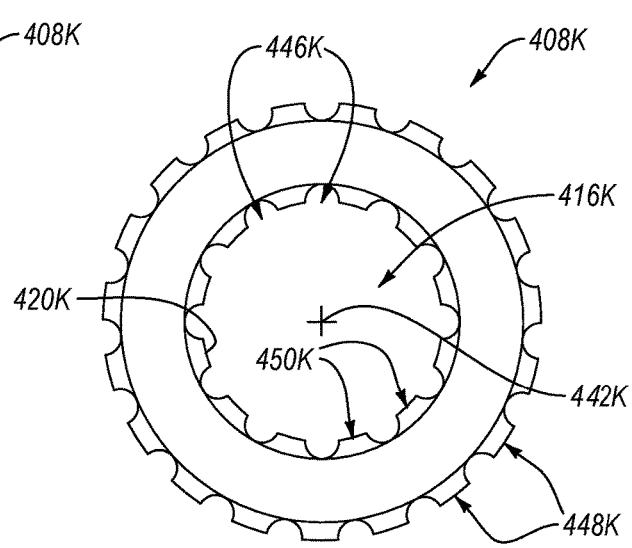
Figure 4M:
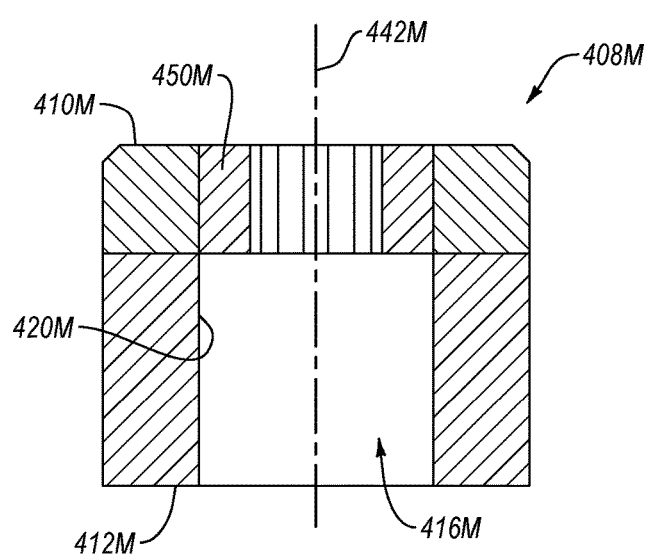
FIGS. 4M and 4N are a side view and a top plan view of a superhard bearing element shown with respect to a central axis, according to an embodiment.
Figure 4N:
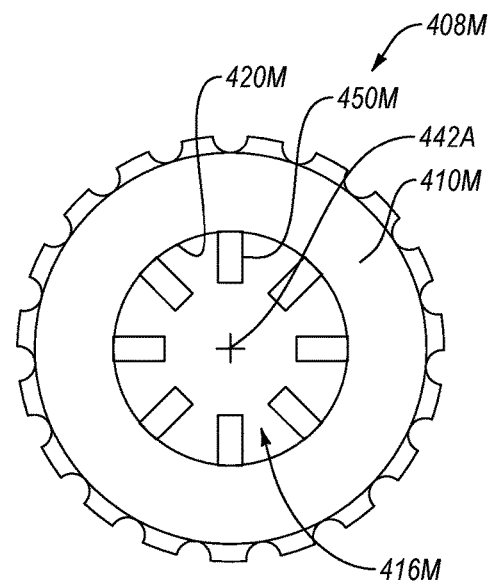
Figure 4P:
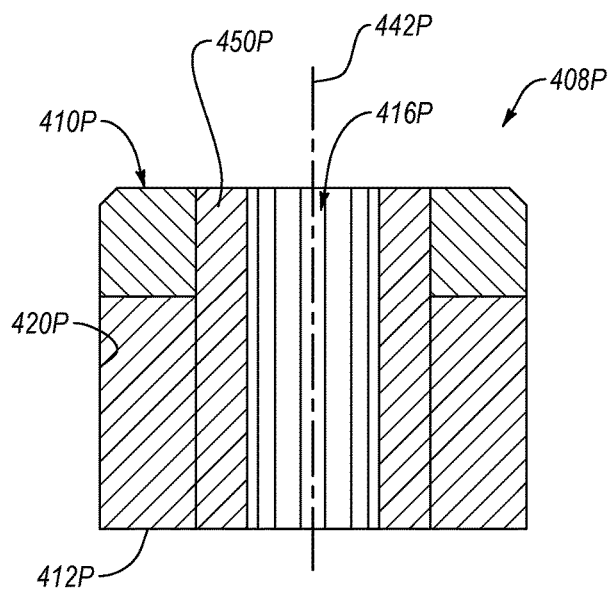
FIGS. 4P and 4Q are a side view and a top plan view of a superhard bearing element shown with respect to a central axis, according to an embodiment.

FIGS. 4A-4P illustrate a various different superhard bearing elements that each includes a plurality of fins, according to different embodiments. In an embodiment, at least one feature of the superhard bearing elements illustrated in FIGS. 4A-4P may be the same as or similar to at least one feature of any of the superhard bearing element disclosed herein. Further, the superhard bearing elements illustrated in FIGS. 4A-4P may be used in any of the bearing assemblies or bearing apparatuses disclosed herein.

FIGS. 4A and 4B are a side view and a top plan view of a superhard bearing element 408A shown with respect to a central axis 442A, according to an embodiment.

The superhard bearing element 408A may include at least one lateral surface 414A extending between a superhard sealing surface 410A and a base surface 412A of the superhard bearing element 408A. The superhard bearing element 408A includes a plurality of grooves 446A formed in the at least one lateral surface 414A of the superhard bearing element 408A. The superhard bearing element 408A also includes a plurality of exterior fins 448A formed between the plurality of grooves 446A. For example, each exterior fin 448A may be formed by and between circumferentially adjacent grooves 446A. The plurality of exterior fins 448A may increase the surface area of the superhard bearing element 408A to enhance heat transfer from the superhard bearing element 408A to at least one environment about the superhard bearing element 408A, a coolant fluid that flows around the superhard bearing element 408A, or a support structure.

The grooves 446A may be formed by electro-discharge machining, laser-cutting, computer numerical control ("CNC") milling, grinding, combinations thereof, or otherwise machining the grooves 446A in the superhard bearing element 408A. For example, suitable laser-machining techniques are disclosed in U.S. Pat. No. 9,062,505 filed on Jun. 22, 2011, the disclosure of which is incorporated herein, in its entirety, by this reference.

In an embodiment, some or all of the grooves 446A may follow a generally straight path (e.g., parallel to central axis 442A) along the lateral surface 414A with a length L that extends generally axially between the superhard sealing surface 410A towards the base surface 412A. In the illustrated embodiment, the length L of some or all of the grooves 446A may extend along only a portion of the lateral surface 414A. For example, the grooves 446A may extend from or near the superhard sealing surface 410A to a location above the base surface 412A. the grooves 446A may extend between the superhard sealing surface 410A and the upper surface of the support structure. Such a configuration may help to secure the superhard bearing element 408A to the support structure. For example, brazed-joint strength between the superhard bearing element 408A and a recess of the support structure may be improved by providing a lateral surface on the portion of the superhard bearing element 408A within the recess that generally corresponds to a lateral surface of the recess. In an embodiment (not shown), some or all of the grooves 446A may be formed substantially parallel to the superhard sealing surface 410A.

Moreover, while the grooves 446A may follow a generally straight path, some or all of the grooves 446A may follow a generally arcuate path, a generally semi-cylindrical path, a generally helical path, a generally S-shaped path, a generally U-shaped path, a generally V-shaped path, a generally linear path, or any other suitable path. The shape of the exterior fins 448A may depend on the path of the grooves 446A. For example, grooves 446A exhibiting a generally arcuate path may form exterior fins 448A exhibiting an arcuate shape.

As illustrated in FIG. 4B, in an embodiment, the exterior fins 448A extends inwardly from the lateral surface 414A for a first distance and the superhard bearing element 408A may include a chamfer 438A that extends inwardly from the lateral surface 414A for a second distance that is greater than or equal to the first distance. In such an embodiment, the chamfer 438A may prevent chipping in the superhard bearing element 408A because the chamfer 438A prevents the exterior fins 448A from contacting an opposing sealing surface during operation.

In an embodiment, the exterior fins 448A may include edge features configured to influence flow conditions (e.g., influence flow of a gas or coolant fluid about the superhard bearing element 408A). For example, the exterior fins 448A may include beveled edges, rounded edges, chamfered edges, or the like. One or more of the exterior fins 448A may include edges that are sharpened, have notches, irregularly shaped, combinations thereof, or the like. Such a configuration may allow the exterior fins 448A to partially agitate, break-up or create desired flow characteristics in a coolant fluid (e.g., a gas or liquid) that is in contact with the superhard bearing element 408A. Further, such edge features may also be selected to increase the surface area of the exterior fins 448A.

In an embodiment, the grooves 446A may have a generally U-shaped cross-section, a generally V-shaped cross-section, a generally rectangular cross-section, a generally semi-circular shaped cross-section, a generally parabolic shaped cross-section, a generally trapezoidal shaped cross-section, combinations thereof, or the like. The cross-section of the grooves 446A may influence the flow conditions of a coolant gas or coolant liquid. For example, at least one of the grooves 446A may have a portion including a U-shaped or V-shaped cross-section configured to improve cooling of the superhard bearing element 408A by increasing the velocity/turbulence of a coolant fluid that contacts the superhard bearing element 408A and/or increasing the surface area in contact with the coolant fluid.

In an embodiment, the exterior fins 448A may be substantially equidistantly and circumferentially distributed about a central axis 442A of the superhard bearing element 408A. In such an embodiment, the grooves 446A may be equidistantly and circumferentially distributed about the central axis 442A of the superhard bearing element 408A. In an embodiment, the exterior fins 448A may be unevenly distributed about the periphery of the superhard bearing element 408A. For example, the superhard bearing element 408A may include one or more exterior fins 448A on a first side of the lateral surface 414A and no grooves on a second side of the lateral surface 414A generally opposite the first side.

FIGS. 4C and 4D are a side view and a top plan view, respectively, of a superhard bearing element 408C shown with respect to a central axis 442C, according to an embodiment. The superhard bearing element 408C includes a lateral surface 414C. The superhard bearing element 408C includes a plurality of grooves 446C formed in the lateral surface 414C (e.g., substantially parallel to central axis 442C). The grooves 446C circumferentially separate adjacent exterior fins 448C of a plurality of exterior fins 448C. One or more features of the grooves 446C and the exterior fins 448C may be the same or similar to one or more features of the grooves 446A and exterior fins 448A of FIGS. 4A-4B, respectively. As shown in FIGS. 4C and 4D, expect that the grooves 446C and the exterior fins 448A extend from or near the superhard sealing surface 410C to an base surface 412C of the superhard bearing element 408C. The grooves 446C and the exterior fins 448C may increase the total surface area of the superhard bearing element 408C relative to the superhard bearing element 408A of FIGS. 4A-4B. The increased surface area of the superhard bearing element 408C can increase the amount of heat that is transferred from superhard bearing element 408C, such as increasing the amount of heat that is transferred from the superhard bearing element 408C to a support structure.

In an embodiment, a support structure may configured to be coupled to the superhard bearing element 408C via a recess exhibiting a shape that substantially corresponds to the shape of the superhard bearing element 408C (e.g., the recess includes a plurality of protrusions that substantially correspond to the grooves 446C). In an embodiment, the superhard bearing elements 408C may be brazed to a support structure.

FIGS. 4E and 4F are a side view and a top plan view, respectively, of a superhard bearing element 408E shown with respect to a central axis 442E, according to an embodiment. The superhard bearing element 408E includes at least one lateral surface 414E extending between a superhard sealing surface 410E and a base surface 412E of the superhard bearing element 408E. The superhard bearing element 408E also includes a plurality of exterior fins 448E that are coupled (e.g., attached) to at least a portion of the lateral surface 414E. The exterior fins 448E may be circumferentially distributed about the superhard bearing element 408E (e.g., about central axis 442E). The exterior fins 448E increase the surface area of the superhard bearing element 408E that is exposed to at least one an environment about the superhard bearing element 408E, a coolant fluid that flows around the superhard bearing element 408E, or the support structure. As such, the exterior fins 448E can increase an amount of heat that is transferred from the superhard bearing element 408E into the environment, a coolant fluid, and/or a support structure. Further, the exterior fins 448E can increase the velocity/turbulence of a coolant fluid flowing around the superhard bearing element 408E and/or capture more of the coolant fluid flowing around the superhard bearing element 408E, each of which can increase the amount of heat transferred into the coolant fluid.

In an embodiment, some or all of the exterior fins 448E may extend from a first location at or near the superhard sealing surface 410E to a second location above the base surface 412E. In an embodiment, the second location may generally correspond to an upper surface of a support structure. Such a configuration may help to secure the superhard bearing element 408E to the support structure. For example, brazed joint strength between the superhard bearing element 408E and a recess of the support structure may be improved by providing a lateral surface 414E on the portion of the superhard bearing element 408E within the recess that generally corresponds to a lateral surface of the recess. In an embodiment (not shown), some or all of the exterior fins 448E may be extend substantially parallel to the central axis 442E.

In an embodiment, the first location of some or all of the exterior fins 448E are below the superhard sealing surface 410E. For example, the first location of some or all of the exterior fins 448E is at or below an intersection of the lateral surface 414E and a chamfer 438E. In such an embodiment, the exterior fins 448E do not contact and bear against an opposing bearing element during operation. As such, the exterior fins 448E are less likely to be damaged during operation. In an embodiment, the first location of some or all of the exterior fins 448E is at the superhard sealing surface 410E. In such an embodiment, some or all of the exterior fins 448E may contact and bear against an opposing bearing element during operation. To limit or inhibit damage of the exterior fins 448E, an uppermost edge of the exterior fins 448E (e.g., the edge that may contact and bear against an opposing bearing element) may be rounded or chamfered.

The exterior fins 448E may exhibit any of a variety of configurations. For example, one or more of the exterior fins 448E may have a generally rectangular shape, an arcuate shape, a generally crescent shape, a generally s-like shape, a generally u-like shape, a generally v-like shape, any other suitable shape, or combinations thereof. In an embodiment, one or more of the exterior fins 448E may include surface features configure to increase the surface area of the exterior fins 448E and/or direct a flow of a coolant fluid around the superhard bearing element 408E. The surface features may include one or more of channels, textural surfaces, nubs, slots, through holes, divots, ridges, notches, any other suitable surface features, or combinations thereof.

In an embodiment, one or more of the exterior fins 448E may include edge features configured to modify at least one of the surface area of the exterior fins 448E or coolant fluid flow around the superhard bearing element 408E. For example, one or more of the exterior fins 448E may include edges that are rounded, flat, curved, combinations thereof, or other suitable edge features. In other embodiments, the exterior fins 448E may include edges that are sharpened, notched, irregularly shaped, combinations thereof, or the like. Such a configuration may allow the exterior fins 448E to partially agitate, direct, or create a desired flow characteristic in the coolant fluid.

The exterior fins 448E may be formed in any suitable manner, and no particular method for forming the exterior fins 448E is to be considered limiting. For example, the exterior fins 448E may be formed of carbon steel, stainless steel, tungsten carbide, ceramic materials (e.g., cemented carbides, polycrystalline diamond), composites, other suitable materials, or combinations thereof. In an embodiment, the exterior fins 448E may include PCD or may be substantially diamond free. In an embodiment, the exterior fins 448E may be integrally or separately formed from the same material as the superhard bearing element 408E. For example, the superhard bearing element 408E may include a PCD table and the exterior fins 448E may include PCD. Forming the exterior fins 448E from PCD can increase the amount of heat that is transferred from the superhard bearing element 408E due to the high thermal conductivity of PCD. In an embodiment, the exterior fins 448E may be formed from a different material than the superhard bearing element 408E. In an example, the exterior fins 448E may be formed of a material exhibiting a higher thermal conductivity than the superhard bearing element 408E. In an example, the exterior fins 448E may be formed of a material that is cheaper and/or easily coupled to the superhard bearing element (e.g., the superhard bearing element 408E includes a PCD table and the exterior fins 448E includes cobalt-cemented tungsten carbide that is bonded to the PCD table).

In an embodiment, the exterior fins 448E may be secured to the superhard bearing element 408E via brazing, welding, press-fitting, fastening with one or more fasteners, an HPHT process, or any other suitable process.

FIGS. 4G and 4H are a side view and a top plan view of a superhard bearing element 408G shown with respect to a central axis 442G, according to an embodiment. The superhard bearing element 408G includes a lateral surface 414G. The superhard bearing element 408G includes a plurality of exterior fins 448G coupled to the lateral surface 414G. One or more features of the exterior fins 448G may be the same or similar to at least one feature of the exterior fins 448E of FIGS. 4E-4F, respectively. In an embodiment, the exterior fins 448E extend from a first location at or near the superhard sealing surface 410G to an base surface 412G of the superhard bearing element 408G. The exterior fins 448G may increase the total surface area of the superhard bearing element 408G relative to the superhard bearing element 408E of FIGS. 4E-4F. The increased surface area of the superhard bearing element 408G can increase the amount of heat that is transferred from superhard bearing element 408G, such as increasing the amount of heat that is transferred from the superhard bearing element 408G (e.g., support structure of a fluid).

In an embodiment, the support structure that is configured to be coupled to the superhard bearing element 408G may define a recess exhibiting a shape that substantially corresponds to the shape of the superhard bearing element 408G (e.g., the recess includes a plurality of channels that substantially correspond to the exterior fins 448G).

FIGS. 4I and 4J are a side cross-sectional view and a top plan view of a superhard bearing element 408I as shown with respect to a central axis 442I, according to an embodiment. The conduit 416I of the superhard bearing element 408I is defined by an interior surface 420I of the superhard bearing element 408I. The interior surface 420I may include a plurality of grooves 446I formed therein. The plurality of grooves 446I may form a plurality of interior fins 450I between adjacent grooves 446I. At least one feature of the grooves 446I and the interior fins 450I may be the same or substantially similar to at least one feature of the groove 446A and the exterior fins 448A of FIGS. 4A-4B, respectively. In an embodiment, the grooves 446I and the interior fins 450I are formed in the interior surface 420I of the superhard bearing element 408I. The superhard bearing element 408I may also include a plurality of exterior fins 448I, such as any of the exterior fins disclosed herein.

The grooves 446I and the interior fins 450I may increase the surface area of the superhard bearing element 408E that is exposed to a fluid flowing through the conduit 416. As such, the grooves 446I and the interior fins 450I can increase the amount of heat that is transferred into the fluid flowing through the conduit 416I.

In an embodiment, the grooves 446I and the interior fins 450I extend from or near the superhard sealing surface 410I to a first location that is spaced from a base surface 412I of the superhard bearing element 408I. For example, the heat is generated by the superhard bearing element 408I at or near the superhard sealing surface 410I. As such, the grooves 446I and the interior fins 450I may decrease the temperature of the superhard bearing element 408I.

FIGS. 4K and 4L are a side view and a top plan view of a superhard bearing element 408K as shown with respect to a central axis 442K, according to an embodiment. The conduit 416K of the superhard bearing element 408K is defined by an interior surface 420K of the superhard bearing element 408K. The interior surface 420K may include a plurality of grooves 446K formed therein. The plurality of grooves 446K may form a plurality of interior fins 450K between adjacent grooves 446K. One or more features of the grooves 446K or the interior fins 450I may be the same or substantially similar to one or more features of the groove 446C or the exterior fins 448C of FIGS. 4C-4D, respectively. In an embodiment, the grooves 446K and the interior fins 450K are formed in the interior surface 420K of the superhard bearing element 408K. The superhard bearing element 408K may also include a plurality of exterior fins 448K, such as any of the exterior fins disclosed herein.

In an embodiment, the grooves 446K and the interior fins 450K extend from or near the superhard sealing surface 410K to a base surface 412K of the superhard bearing element 408K. As such, the grooves 446K and the interior fins 450K cause the superhard bearing element 408K to exhibit a larger surface area that is exposed to a fluid flow therethrough than the superhard bearing element 408I of FIGS. 4I-4J. Therefore, the grooves 446K and the interior fins 450K can cause more heat to be transferred from the superhard bearing element 408K than if the grooves 446K and the interior fins 450K only extend along a portion of the length of the interior surface 420K.

FIGS. 4M and 4N are a side view and a top plan view of a superhard bearing element 408M shown with respect to a central axis 442M, according to an embodiment. The superhard bearing element 408M includes a conduit 416M that is defined by an interior surface 420M of the superhard bearing element 408M. The interior surface 420M may include a plurality of interior fins 450M coupled thereto. One or more features of the interior fins 450M may be the same or substantially similar to one or more features of the exterior fins 448E of FIGS. 4E-4F. In an embodiment, the interior fins 450M are coupled to the interior surface 420M of the superhard bearing element 408M. The interior fins 450M increase the surface area of the superhard bearing element 408M that is exposed to a fluid flowing through the conduit 416M. As such, the interior fins 450M can increase the amount of heat that is transferred into the fluid flowing through the conduit 416M. The superhard bearing element 408M may also include a plurality of exterior fins 448M, such as any of the exterior fins disclosed herein.

In an embodiment, the interior fins 450M extend from or near the superhard sealing surface 410M to a first location that is spaced from a base surface 412M of the superhard bearing element 408M. For example, the maximum temperatures generated by the superhard bearing element 408M are at or near the superhard sealing surface 410M. As such, the interior fins 450M can decrease the maximum temperatures generated by the superhard bearing element 408M.

Figure 4Q:
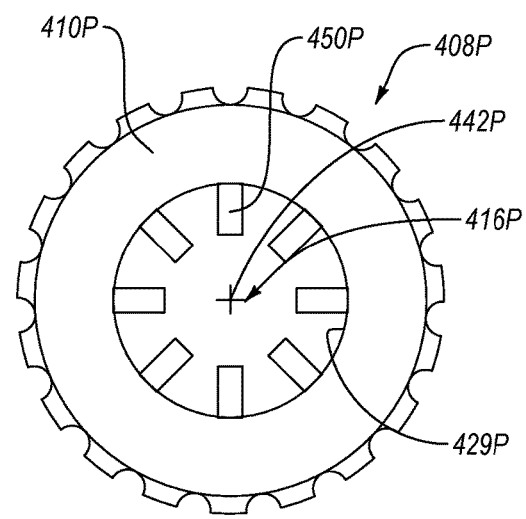

FIGS. 4P and 4Q are a side view and a top plan view of a superhard bearing element 408P shown with respect to a central axis 442P, according to an embodiment. The superhard bearing element 408P includes a conduit 416P that is defined by an interior surface 420P of the superhard bearing element 408P. The interior surface 420P may include a plurality of interior fins 450P coupled thereto. One or more features of the interior fins 450P may be the same or substantially similar to one or more features of the exterior fins 448G of FIGS. 4G-4I. In an embodiment, the interior fins 450P are coupled to the interior surface 420P of the superhard bearing element 408P. The superhard bearing element 408P may also include a plurality of exterior fins 448P, such as any of the exterior fins disclosed therein.

In an embodiment, the interior fins 450P extend from or near the superhard sealing surface 410P to a base surface 412P of the superhard bearing element 408P. As such, the interior fins 450P may cause the superhard bearing element 408P to exhibit a larger surface area that is exposed to a fluid flow therethrough (e.g., as compared to a similar-sized superhard bearing element 408M of FIGS. 4M-4N). Therefore, the interior fins 450P can cause more heat to be transferred from the superhard bearing element 408P than if the interior fins 450P only extend along a portion of the length of the interior surface 420P.

Figure 5:
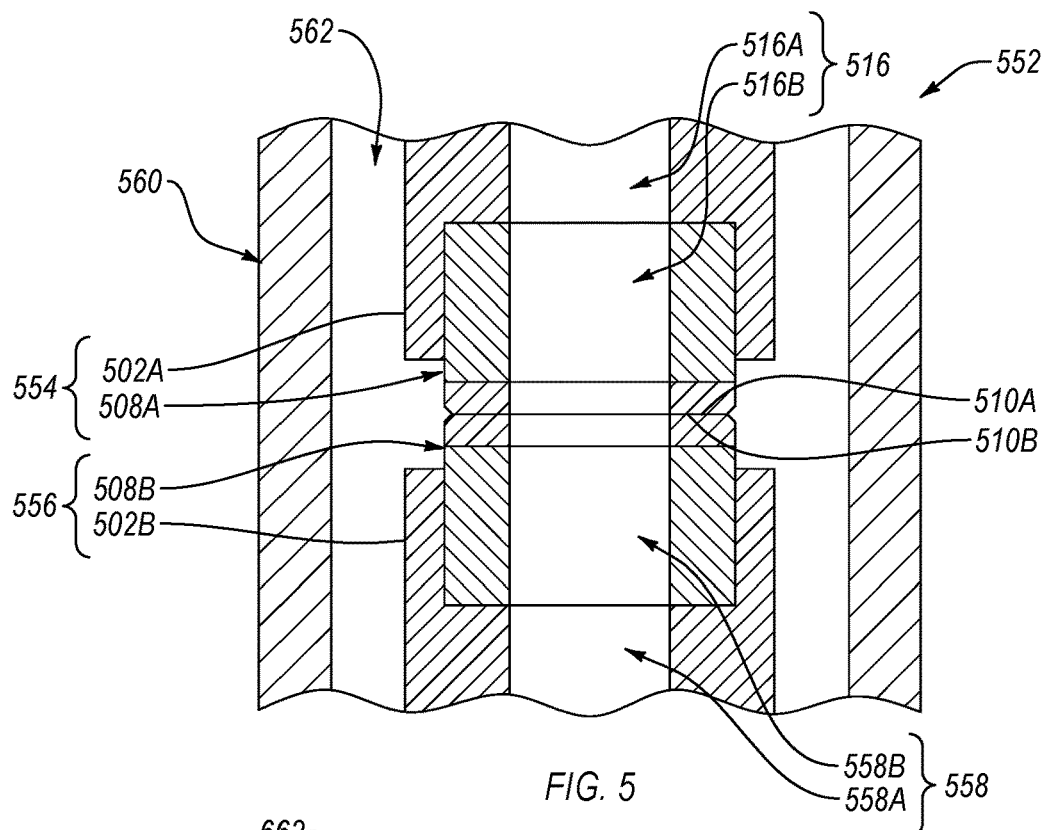
FIG. 5 is a side cross-sectional view of a portion of a bearing apparatus, according to any embodiment.

Any of the above-described embodiments may be employed in a bearing apparatus. FIG. 5 is a side cross-sectional view of a portion of a bearing apparatus 552, according to any embodiment. The bearing apparatus 552 includes a bearing assembly 554 and bearing assembly 556. The terms "rotor" and "stator" refer to rotating and stationary components of the bearing apparatus 552, respectively. For example, the bearing assembly 554 may be the rotor and the bearing assembly 556 may be the stator, or vice versa.

In an embodiment, as illustrated, one or more features of the stator bearing assembly 554 is the same as or substantially similar to one or more features of any of the bearing assemblies disclosed herein. For example, the stator bearing assembly 554 may include a first support structure 502A and a superhard bearing element 508A. The first support structure 502A and the first superhard bearing element 508A may include any of the support structures or superhard bearing elements disclosed herein. For example, the superhard bearing element 508A may include a first superhard sealing surface 510A. The stator bearing assembly 554 may also define a first conduit 516 extending therethrough. The first conduit 516 may include a first support structure conduit 516A extending through the first support structure 502A and a first bearing element conduit 516B extending through the first superhard bearing element 508A.

In an embodiment, as illustrated, one or more features of the bearing assembly 556 may be the same as or substantially similar to one or more features of any of the bearing assemblies disclosed herein. For example, the bearing assembly 556 may include a second support structure 502B and a second superhard bearing element 508B. The second support structure 502*b* and the second superhard bearing element 508B may include any of the support structures or superhard bearing elements disclosed herein. For example, the second superhard bearing element 508B may include a second superhard sealing surface 510B. The bearing assembly 556 may also define a second conduit 558 extending therethrough. The second conduit 558 may include a second support structure conduit 558A extending through the second support structure 502B and a second bearing element conduit 558B extending through the second superhard bearing element 508B.

In an embodiment, the first superhard bearing element 508A and the second superhard bearing element 508B includes substantially the same materials. In such an embodiment, the first and second superhard bearing elements 508A, 508B wear at substantially the same rate. In an embodiment, the first superhard bearing element 508A and the second superhard bearing element 508B include different materials. For example, one of the first or second superhard bearing elements 508A, 508B may include a first superhard material and the other of the first or second superhard bearing elements 508A, 508B may include a second superhard material. The first superhard material may exhibit a wear resistance that is greater than the second superhard material. As such, the second superhard material may wear at a faster rate than the first superhard material which may cause the superhard bearing element that includes the second superhard material to better conform to the superhard bearing element that includes the first superhard material. Such a configuration may better inhibit the flow of the fluid between the first and second superhard sealing surfaces 510A, 510B. Additionally, preferentially wearing the superhard bearing element that includes the second superhard material may cause the superhard bearing element that includes the second superhard material to exhibit a relatively smooth or very smooth surface finish faster than if both superhard bearing elements included the first superhard material. In an embodiment, the superhard bearing element that includes the second superhard material can decrease the costs of operating the bearing apparatus 552. For example, the first superhard material (e.g., PCD) can more expensive than the second superhard material (e.g., tungsten carbide). Preferentially wearing the superhard bearing element that includes the second superhard material relative to the superhard bearing element that includes the first superhard material may increase the life span of the more expensive superhard bearing element.

The bearing assembly 552 may optionally include a housing 560 defining a passage 562. In an embodiment, passage 562 may be substantially scaled to form a chamber. The bearing assembly 554 and the bearing assembly 556 may be at least partially disposed in the passage 562. In an embodiment, the passage 562 is not sealed. The housing 560 may be configured to be stationary or rotate relative to at least the bearing assembly 554. In an embodiment, the housing 560 does not include one or more O-rings or other sealing devices because the bearing assembly 554 and the bearing assembly 556 may be configured to prevent the fluid flowing through the first and second conduits 516, 558 from leaking into the passage 562.

The bearing assembly 554 and the bearing assembly 556 are positioned such that the first and the second superhard sealing surfaces 510A, 510B contact each other and the first and second conduits 516, 558 are aligned with one another. In operation, the bearing assembly 556 may rotate relative to the bearing assembly 554 and a fluid may flow through the first and second conduits 516, 558. In an embodiment, the fluid may flow through the first and second conduit 516, 558 substantially without leaking between the first and second superhard sealing surfaces 510A, 510B.

However, in operation, the first and second superhard bearing elements 508A, 508B can generate significant amounts of heat. As such, in operation, at least one of the bearing assembly 554 or the bearing assembly 556 may be configured to transfer heat from the superhard bearing elements thereof. In an embodiment, at least one of the first or second superhard bearing elements 508A, 508B may be configured to transfer heat into the first or second support structure 502A, 502B.

In an embodiment, at least one of the first or second superhard bearing elements 508A, 508B may be configured to transfer heat into the passage 562 (e.g., into the atmosphere about the first or second superhard bearing elements 508A, 508B). For example, any surface of the superhard bearing elements 508A, 508B that are exposed to the passage 562 can transfer heat into the passage 562. However, transferring heat into the passage 562 into the passage 562 may be inefficient because the passage 562 may be filled with a gas (e.g., air) and the gas may be stationary. As such, at least one of the first or second superhard bearing elements 508A, 508B may include exterior fins. The exterior fins may increase the surface area of the superhard bearing elements 508A, 508B thereby increasing the amount of heat that is transferred into the passage 562. Further, the exterior fins may cause the gas in the passage 562 to move thereby increasing the amount of heat that is transferred into the passage 562.

In an embodiment, at least one of the first or second superhard bearing elements 508A, 508B may be configured to transfer heat into the fluid flowing through the first and second conduits 516, 558. The amount of heat that is transferred into the fluid may depend directly on the surface area of the first or second superhard bearing elements 508A, 508B that contact the fluid. For example, at least one of the first or second superhard bearing elements 508A, 508B may include a plurality of interior fins. In an embodiment, the fluid flow through the first or second conduits 516, 558 may be intermittent, which can limit the amount of heat that is transferred into the fluid. However, the presence of the interior fins can enhance the amount of heat that is transferred into the fluid when it does flow through the first and second conduits 516, 558 and can increase the amount of heat that is transferred into the first and second conduits 516, 558 when the fluid is not flowing through the first and second conduits 516, 558 (e.g., transfers heat into a stagnant fluid). Further, the presence of other thermal management features can limit the temperature of and/or limit damage to the first and second superhard bearing elements 508A, 508B when the fluid is not flowing the first and second conduits 516, 558. Temperature of one of the rotor and/or stator may be measured. In an embodiment, fluid flow may be increased when the temperature exceeds a selected value.

It is noted that, in an embodiment, one of the bearing assembly 554 or the bearing assembly 556 may be different than the bearing assemblies disclosed herein. In an example, one of the bearing assembly 554 or the bearing assembly 556 may include a non-superhard bearing element defining a conduit instead of the superhard bearing element. In an example, one of the bearing assembly 554 or the bearing assembly 556 may include a single component defining a conduit that functions as both a bearing element and a support structure.

Figure 6:
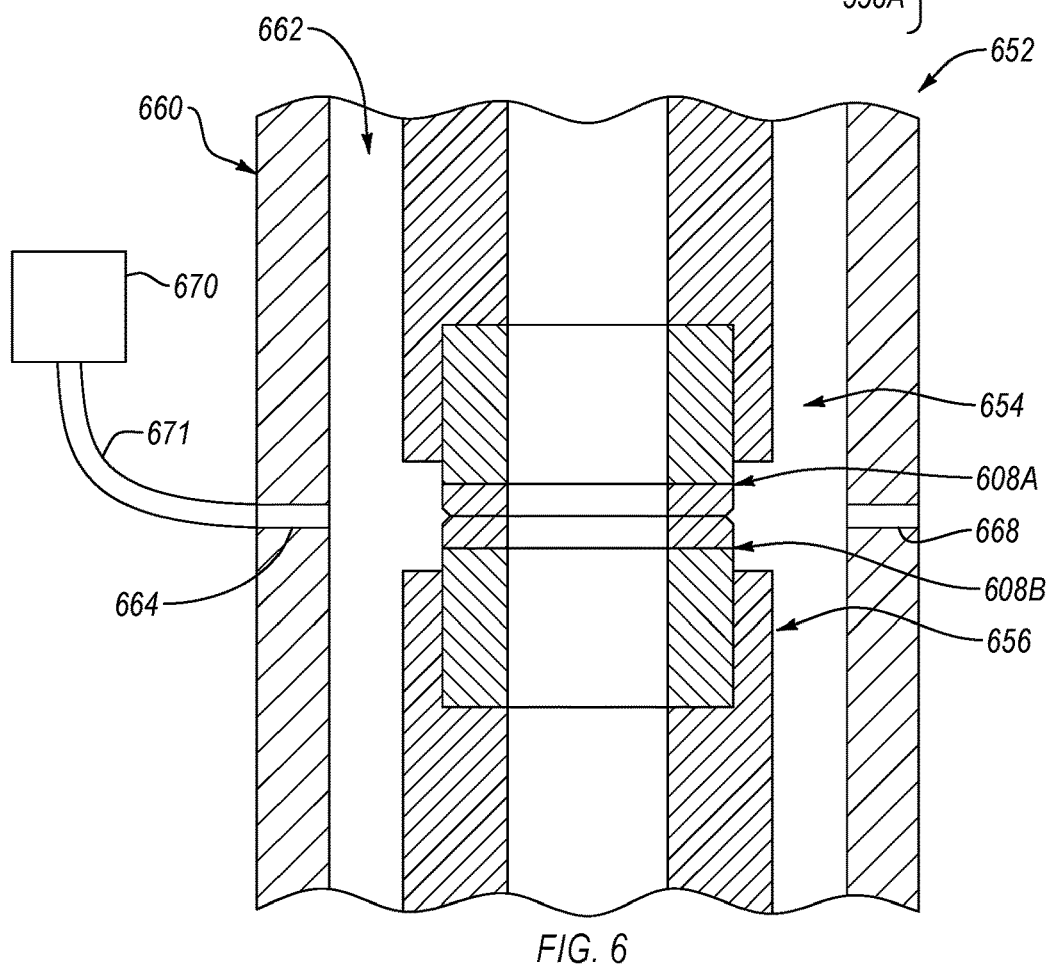
FIG. 6 is a side cross-sectional view of a portion of a bearing apparatus, according to any embodiment.

FIG. 6 is a side cross-sectional view of a portion of a bearing apparatus 652, according to any embodiment. In an embodiment, at least one feature of the bearing apparatus 652 may be the same as or substantially similar to at least one feature of the bearing apparatus 552 of FIG. 5. For example, the bearing apparatus 652 may include a bearing assembly 654 including a first superhard bearing element 608A, a bearing assembly 656 including a second superhard bearing element 608B, and a housing 660 defining a passage 662. At least a portion of the bearing assembly 654 and the bearing assembly 656 are disposed in the passage 662.

The housing 660 may define an inlet 664 and an outlet 668. The bearing apparatus 652 may also include a coolant source 670 (e.g., a pump) coupled to the inlet 664. For example, the bearing apparatus 652 may include tubing 671 extending from the coolant source 670 to the inlet 664. The coolant source 670 may include a coolant fluid disposed therein or may be configured to draw coolant fluid from a reservoir. The coolant source 670 may be configured to flow the coolant fluid into the passage 662. The coolant fluid may be dispelled from the passage 662 using the outlet 668. Optionally, coolant fluid dispelled from passage 662 may be recirculated via coolant source 664. As such, the coolant fluid may flow around at least a portion of the first superhard bearing element 608A and/or second superhard bearing elements 608B, thereby increasing the amount of heat transferred from the first superhard bearing element 608A and/or second superhard bearing elements 608A, 608B (e.g., a gas, a liquid, or both).

The coolant fluid may include any fluid. In an example, the coolant fluid may include a fluid that exhibits room temperature (e.g., about 20° C. to about 30° C.). In an example, the coolant fluid may include a fluid that exhibits a temperature that is greater than about room temperature. In an embodiment, the coolant fluid may include a fluid that exhibits a temperature that is less than room temperature, such as when the coolant source 670 includes a chiller. Cooling the coolant fluid to a temperature that is less than room temperature may increase the amount of heat transferred from the first and second superhard bearing elements 608A, 608B to the coolant fluid. In an embodiment, the coolant source 670 may be coupled to the outlet 668 such that the coolant source 670 receives the coolant fluid that was dispelled from the passage 662 and recirculates the coolant fluid. In an embodiment, the coolant fluid includes a liquid. In such an embodiment, O-rings or other sealing devices may be configured to fluidly seal the passage 662. In an example, the coolant fluid includes a gas, such as atmospheric air or nitrogen. In an embodiment, a gaseous coolant fluid may not include O-rings or other sealing device (e.g., since the gaseous coolant fluid may be dispensed into the atmosphere). Also, a gaseous coolant fluid may contact the first and second superhard bearing elements 608A, 608B without exhibiting a phase change due to the heat absorbed thereby, unlike some liquid coolant fluids. Accordingly, any gas, fluid, or mixture of gas and fluid may be employed to achieve a desired heat transfer or cooling, without limitation.

In an embodiment, at least one of the superhard bearing elements, bearing assemblies, or bearing apparatus may include two or more conduits. In an example, the two or more conduits may be configured to allow two or more different fluids to flow therethrough (e.g., the two or more fluids flowing in the same direction). In an example, the two or more conduits may be configured to have the same fluid to flow therethrough. For example, one of the two or more conduits may form a fluid intake while another of the two or more conduits may form a fluid exhaust.

Figures 7A, 7B:
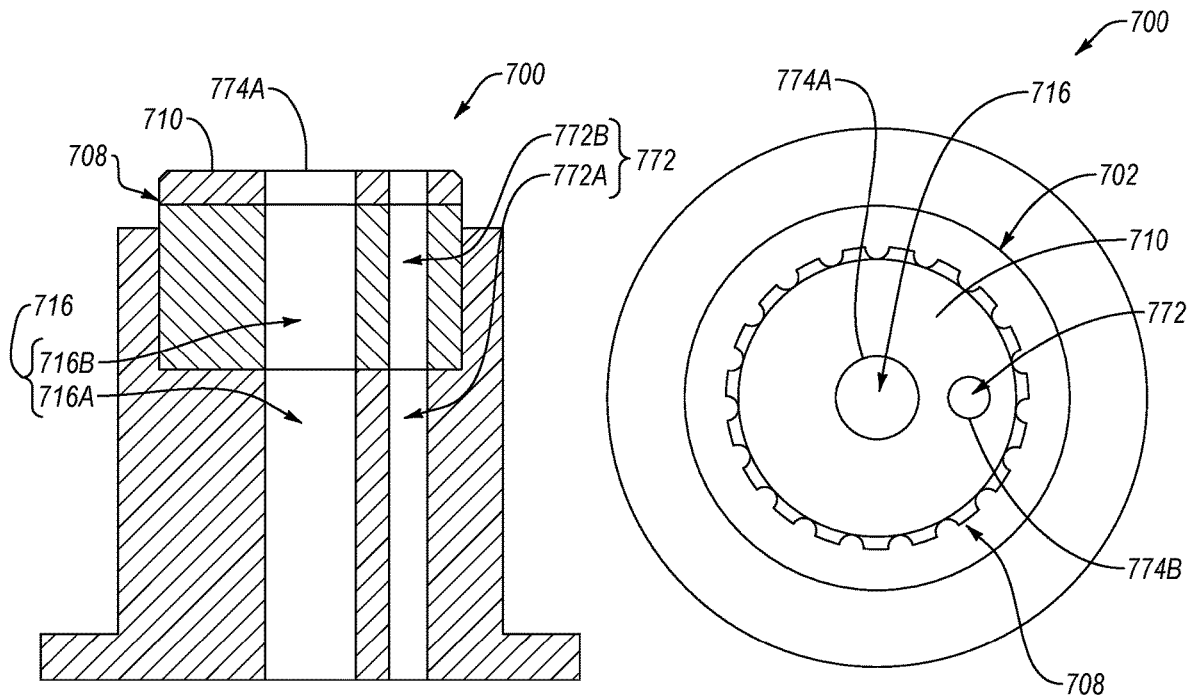
FIGS. 7A and 7B are a schematic cross-sectional view and a top plan view, respectively, of a bearing assembly, according to an embodiment.

FIGS. 7A and 7B are a schematic cross-sectional view and a top plan view, respectively, of a bearing assembly 700, according to an embodiment. In an embodiment, at least one feature of the bearing assembly 700 may be the same as or similar to at least one feature of any of the bearing assemblies disclosed herein. For example, the bearing assembly 700 may include a support structure 702 and a superhard bearing element 708 that, except as otherwise disclosed herein, are the same as or substantially similar to any of the support structures and superhard bearing elements disclosed herein. Optionally, bearing assembly 700 may be used in any of the bearing apparatuses disclosed herein.

The bearing assembly 700 defines a first conduit 716 and a second conduit 772 extending therethrough, respectively. The first conduit 716 may include a conduit section 716A extending through the support structure 702 and a conduit section 716B extending through the superhard bearing element 708. The first conduit 716 may also include a first port 774A where the first conduit 716 opens to the superhard sealing surface 710. In an embodiment, the first port 774A is located at a center of the superhard sealing surface 710. In such an embodiment, the first port 774A may remain substantially fluidly coupled with a corresponding conduit of an opposing bearing element (e.g., the corresponding conduit of the opposing bearing element includes a port at a center of the sealing surface thereof). In an embodiment, the first port 774A may be spaced from the center of the superhard sealing surface 710. In such an embodiment, the first port 774A may be aligned with an identical corresponding conduit occasionally during rotation.

The second conduit 772 may include a second support structure conduit 716A extending through the support structure 772A and a second bearing element conduit 772B extending through the superhard bearing element 708. The second conduit 772 may also include a second port 774B where the second conduit 772 extends to the superhard sealing surface 710. The second port 774B is located radially outwardly from the first port 774A. As such, the second portion 774B may be intermittently aligned with to a corresponding conduit of an identical, opposing bearing element during rotation.

Figures 8A, 8B:
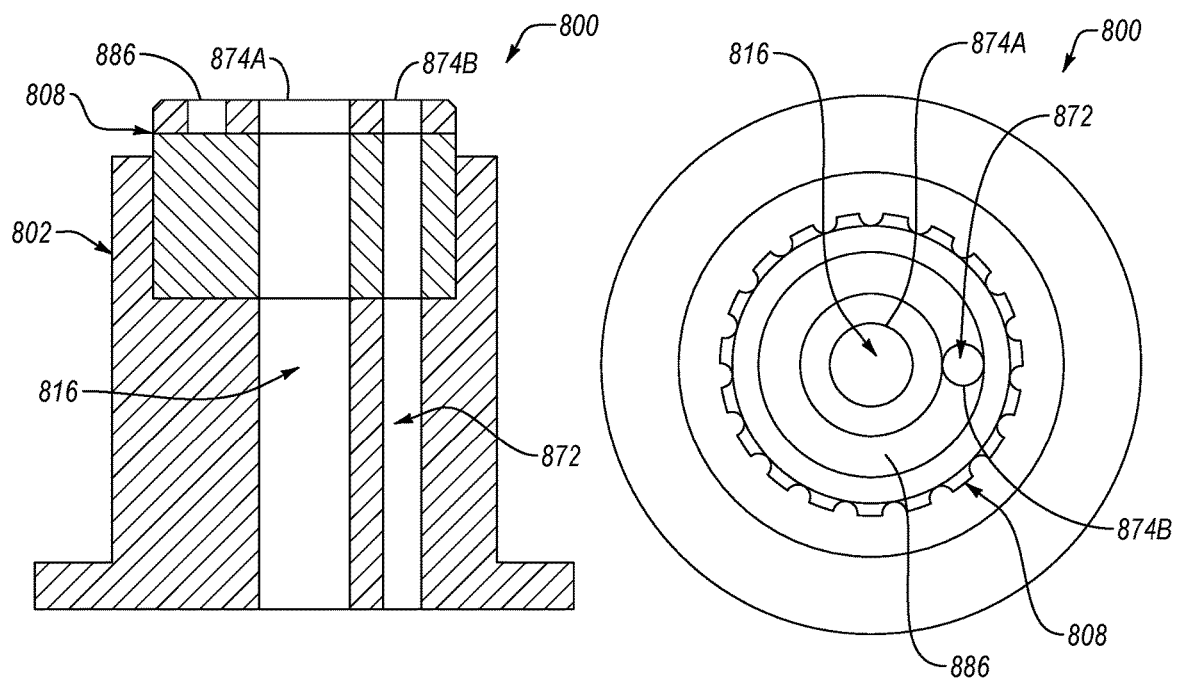
FIGS. 8A and 8B are a schematic cross-sectional view and a top plan view, respectively, of a bearing assembly, according to an embodiment.

FIGS. 8A and 8B are a schematic cross-sectional view and a top plan view, respectively, of a bearing assembly 800, according to an embodiment. In an embodiment, at least one feature of the bearing assembly 800 may be the same as or substantially similar to at least one feature of any of the bearing assemblies disclosed herein. For example, the bearing assembly 800 may include a support structure 802 and a superhard bearing element 808 that, except as otherwise disclosed herein, are the same as or substantially similar to any of the support structures or superhard bearing elements disclosed herein, respectively. Further, the bearing assembly 800 may be used in any of the bearing apparatuses disclosed herein.

The bearing assembly 800 includes a first conduit 816 and a second conduit 872 extending therethrough. At least one feature of the first and second conduits 816, 872 may be the same as or substantially similar to at least one feature of the first and second conduits 716, 772 of FIGS. 7A-7B. For example, the first conduit 816A may include a first port 874A located at a center of the superhard sealing surface 810 and the second conduit 872 may include a second port 874B spaced from the center of the superhard sealing surface 810. The bearing assembly 800 also includes at least one channel 886 formed in the superhard bearing element 808. The channel 886 may be spaced from a center of the superhard sealing surface 810 by a selected distance that corresponds to a location of the second port 874B of second conduit 872. The channel 886 may allow the second portion 874B to be continuously coupled (e.g., during rotation allowing fluid to flow between the conduits 772, 872) to a corresponding conduit of an opposing bearing element configured as bearing assembly 700 or an identical opposing bearing element 800. For example, the opposing bearing element can flow fluid directly into the second portion 874B when the conduit 772, 872 of the opposing bearing element 708, 808 is rotating (e.g., the conduit 772, 872 of the opposing bearing element 708, 808 may conduct fluid into the channel 886 of the first bearing element 808 and the fluid may flow through the channel 886 until it reaches the second portion 874B).

Figure 9:
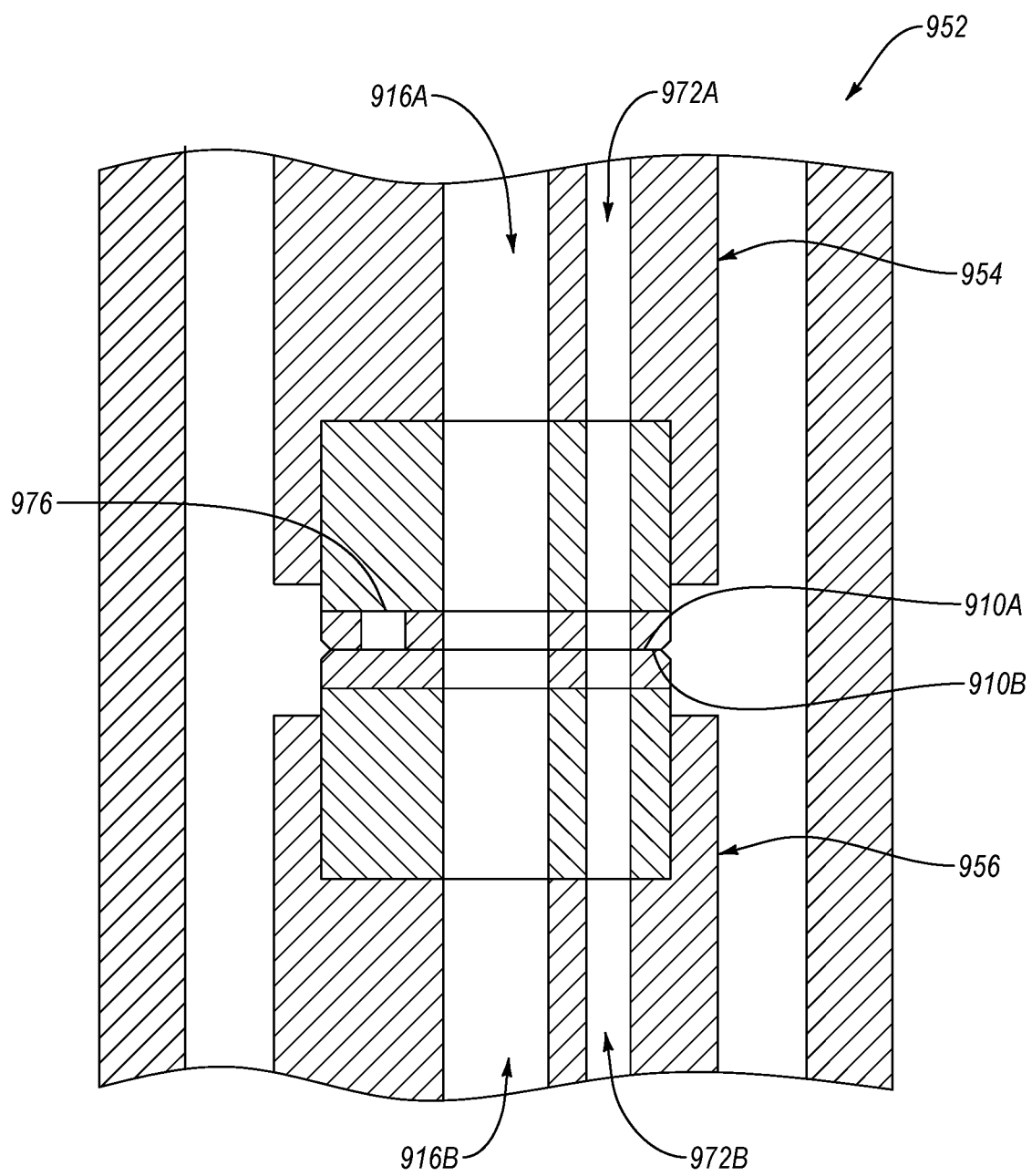
FIG. 9 is a schematic cross-sectional view of a bearing apparatus, according to an embodiment.

FIG. 9 is a schematic cross-sectional view of a bearing apparatus 952, according to an embodiment. In an embodiment, at least one feature of the bearing apparatus 952 may be the same as or substantially similar to at least one feature any of the bearing apparatuses disclosed herein. For example, the bearing apparatus 952 may include a bearing assembly 954 and a bearing assembly 956. At least one feature of the bearing assembly 954 may be the same as or substantially to similar to at least one feature of the bearing assembly 700 of FIGS. 7A-7B or the bearing assembly 800 of FIGS. 8A-8B. At least one feature of the bearing assembly 956 may be the same as or substantially similar to at least one feature of the bearing assembly 700 of FIGS. 7A-7B or the bearing assembly 800 of FIGS. 8A-8B. In an embodiment, bearing assembly 954 may be a stator and bearing assembly 956 may be a stator, or vice versa.

In an embodiment, the bearing assembly 954 may include a first conduit 916A and a second conduit 972A and the bearing assembly 956 may include a third conduit 916B and a fourth conduit 972B. The first conduit 916A and the third conduit 916B may be coupled together (to conduct fluid therethrough, collectively) and the second conduit 972A and the fourth conduit 972B may be coupled together (to conduct fluid therethrough, collectively). In an embodiment, the first and third conduits 916A, 916B may continuously conduct fluid because the ports of the first and third conduits 916A, 916B are located at a center of their respective superhard sealing surfaces 910A, 910B even when one of the bearing assemblies 954, 956 is rotating relative to the other of the bearing assemblies 954, 956. In an embodiment, the second and fourth conduits 972A, 972B may continuously conduct fluid even when one of the bearing assemblies 854, 956 is rotating relative to the other of the bearing assemblies 954, 956 because the bearing assembly 954 includes a channel 976 that corresponds to the ports of the second and fourth conduits 972A, 972B. It is noted that the bearing assembly 956 may include a channel instead of or in conjunction with the bearing assembly 954.

Figure 10:
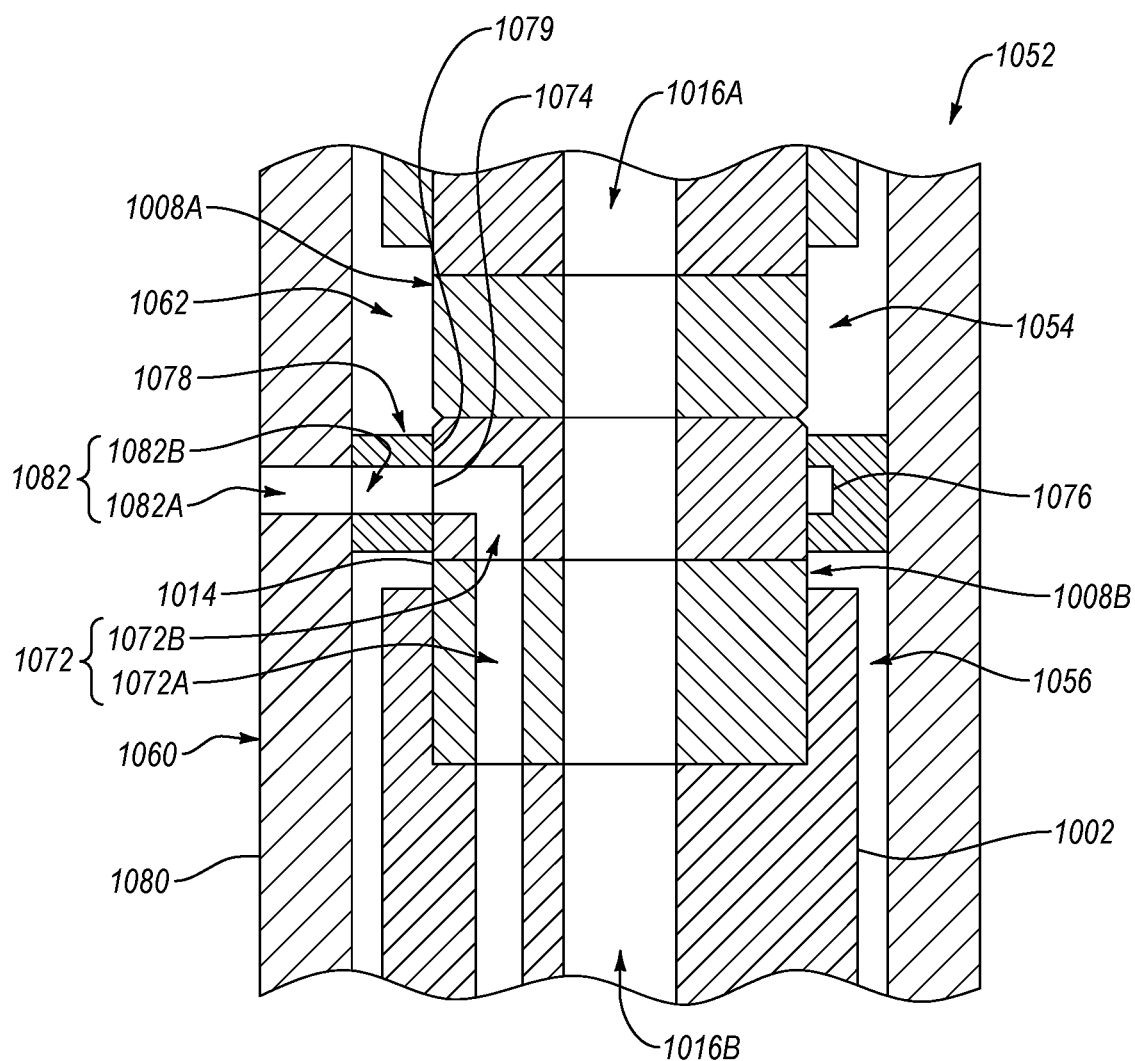
FIG. 10 is a schematic cross-sectional view of a bearing apparatus, according to an embodiment.

FIG. 10 is a schematic cross-sectional view of a bearing apparatus 1052, according to an embodiment. In an embodiment, at least one feature of the bearing apparatus 1052 may be the same as or substantially similar to at least one feature of any of the bearing apparatuses disclosed herein. For example, the bearing apparatus 1052 may include a first bearing assembly 1054 including a first superhard bearing element 1008A, a second bearing assembly 1056 including a second superhard bearing element 1008B coupled to a support structure 1002, and a housing 1060 defining a passage 1062 that includes at least a portion of the first bearing assembly 1054 and the second bearing assembly 1056 disposed therein. The first bearing assembly 1054 may form the stator or rotor of the bearing apparatus 1052 and the second bearing assembly 1056 may form the other of the stator or the rotor.

In an embodiment, the second bearing assembly 1056 may be configured to receive a fluid from the first bearing assembly 1054. For example, the first bearing assembly 1054 defines at least one first conduit 1016A extending therethrough and the second bearing assembly 1056 defines at least one second conduit 1016 extending therethrough. The first and second conduits 1016A, 1016B may be coupled together so as to flow a fluid therethrough.

In an embodiment, the second bearing assembly 1056 may be configured to also receive a fluid from (or through) the housing 1060. For example, the housing 1060 may include a radial bearing assembly 1078. The radial bearing assembly 1078 may include a bearing surface 1079 is configured to contact a lateral surface 1014 of the second superhard bearing element 1008B. The radial bearing assembly 1078 may include a superhard material defining a bearing surface 1079 thereof (e.g., the bearing surface 1079 is a superhard bearing surface) or a non-superhard material defining the bearing surface 1079. The radial bearing assembly 1078 may be coupled to or integrally formed with a body 1080 of the housing 1060. The housing 1060 may define a third conduit 1082. The third conduit 1082 may include a body conduit 1082A extending through the body 1080 of the housing 1060 and a radial bearing element conduit 1082B extending through the radial bearing assembly 1078.

The second bearing assembly 1056 defines a fourth conduit 1072 extending therethrough. The fourth conduit 1072 may include a support structure conduit 1072A extending through the support structure 1002 and a bearing element conduit 1072B extending through the second superhard bearing element 1008B. The bearing element conduit 1072B may be configured (e.g., include a bend formed therein) to allow the fourth conduit 1072 to flow fluid to a port 1074 on a lateral surface 1014 of the second superhard bearing element 1008B. As such, the fourth conduit 1072 may conduct fluid to or from the third conduit 1082.

In an embodiment, the radial bearing assembly 1078 defines a channel 1076 therein that allows the third conduit 1082 to be continuously coupled to the fourth conduit 1072. In an embodiment, the second superhard bearing element 1008B defines a channel (not shown) that continuously allows fluid to pass between the fourth conduit 1072 and the third conduit 1082. In such an embodiment, the radial bearing assembly 1078 may define the channel 1076 or the channel 1076 may be omitted therefrom. In an embodiment, neither the radial bearing assembly 1078 or the second superhard bearing element 1008B defines a channel.

Figure 11:
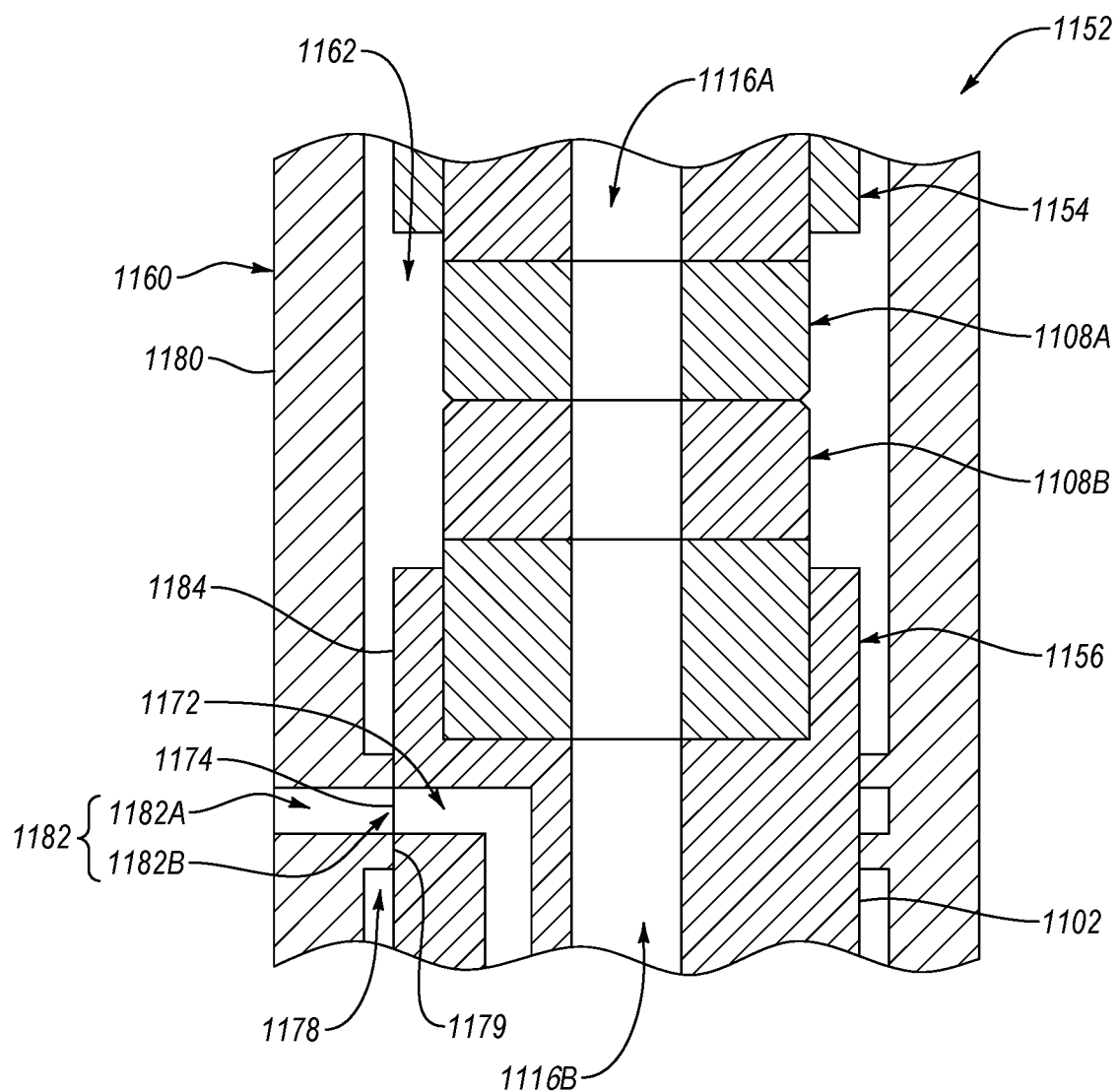
FIG. 11 is a schematic cross-sectional view of a bearing apparatus, according to an embodiment.

FIG. 11 is a schematic cross-sectional view of a bearing apparatus 1152, according to an embodiment. In an embodiment, at least one feature of the bearing apparatus 1152 may be the same as or substantially similar to at least one feature of any of the bearing apparatuses disclosed herein. For example, the bearing apparatus 1152 may include a first bearing assembly 1154 including a first superhard bearing element 1108A, a second bearing assembly 1156 including a second superhard bearing element 1108B coupled to a support structure 1102, and a housing 1160 defining a passage 1162 that includes at least a portion of the first bearing assembly 1154 and the second bearing assembly 1156 disposed therein. The first bearing assembly 1154 may form the stator or rotor of the bearing apparatus 1152 and the second bearing assembly 1156 may form the other of the stator or the rotor.

In an embodiment, the second bearing assembly 1156 may be configured to receive a fluid from the first bearing assembly 1154. For example, the first bearing assembly 1154 defines at least one first conduit 1116A extending therethrough and the second bearing assembly 1156 defines at least one second conduit 1116B extending therethrough. The first and second conduits 1116A, 1116B may be configured to flow fluid therethrough.

In an embodiment, the second bearing assembly 1156 may be configured to receive a fluid from the housing 1160. For example, the housing 1160 may include a radial bearing assembly 1178. The radial bearing assembly 1178 may include a bearing surface 1179 that is configured to contact and bear against a lateral surface 1184 of the support structure 1102. The radial bearing assembly 1178 may include a superhard material defining a bearing surface 1179 thereof (e.g., the bearing surface 1179 is a superhard bearing surface) or a non-superhard material defining the bearing surface 1179. The radial bearing assembly 1178 may be coupled to or integrally formed with a body 1180 of the housing 1160. The housing 1160 may define a third conduit 1182. The third conduit 1182 may include a body conduit 1182A extending through the body 1180 of the housing 1160 and a radial bearing element conduit 1182B extending through the radial bearing assembly 1178.

The second bearing assembly 1156 defines a fourth conduit 1172 extending through the support structure 1102. The fourth conduit 1172 may include a bend formed therein which allows the fourth conduit 1172 to include a port 1174 on the lateral surface 1184 of the support structure 1102. As such, the fourth conduit 1172 and the third conduit 1182 may be configured to conduct fluid. In an embodiment, the portion of the lateral surface 1184 of the support structure 1102 that contacts the sealing surface 1179 may include a superhard material (e.g., the portion of the lateral surface 1184 is a superhard sealing surface). In an embodiment, the portion of the lateral surface 1184 of the support structure 1102 that contacts the sealing surface 1179 may include a non-superhard material.

Figure 12:
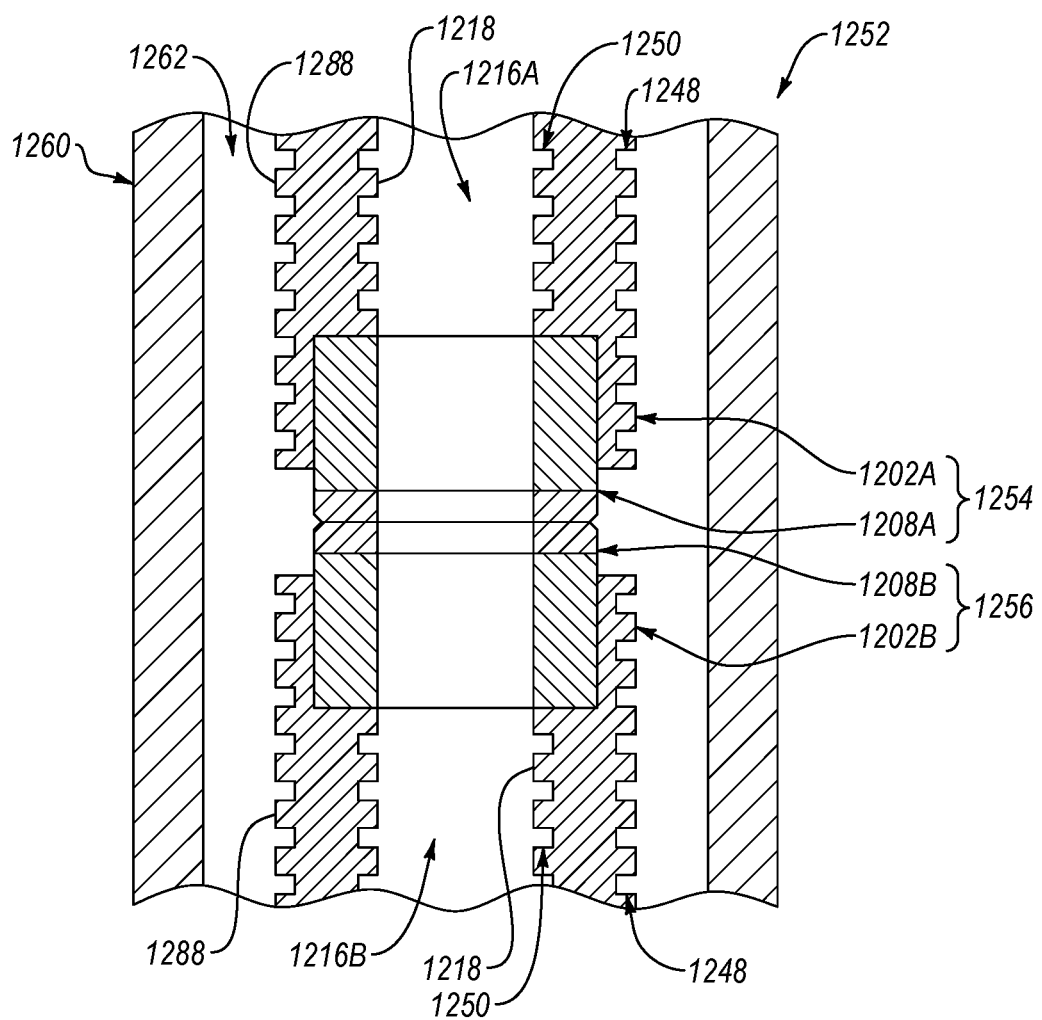
FIG. 12 is a side cross-sectional view of a portion of a bearing apparatus, according to an embodiment.

FIG. 12 is a side cross-sectional view of a portion of a bearing apparatus 1252, according to an embodiment. In an embodiment, at least one feature of the bearing apparatus 1252 may be the same as or substantially similar to at least one feature of any of the bearing apparatuses 1252 disclosed herein. For example, the bearing apparatus 1252 may include a bearing assembly 1254 including a first superhard bearing element 1208A, a bearing assembly 1256 including a second superhard bearing element 1208B, and a housing 1260 defining a passage 1262. At least a portion of the bearing assembly 1254 and the bearing assembly 1256 are disposed in the passage 1262.

The bearing assemblies 1254, 1256 may include a first support structure 1202A and a second support structure 1202B, respectively. Each of the first and second support structures 1202A, 1202B may include at least one support structure interior surface 1218 and at least one support structure exterior surface 1288. The support structure interior surfaces 1218 of the first and second support structures 1202A, 1202B may at least partially define the conduits 1216A, 1216B of the first and second support structures 1202A, 1202B, respectively. The at least one support structure exterior surface 1288 may generally oppose the support structure interior surface 1218 and may at least partially define the passage 1262.

In an embodiment, at least one of the first or second support structure 1202A, 1202B can include a plurality of fins separated from each other by a plurality of grooves formed therein. In an embodiment, at least one of the exterior surface 1288 of the first support structure 1202A or the exterior surface 1288 of the second support structure 1202B may include a plurality of exterior fins 1248. At least one feature of the exterior fins 1248 may be the same as or substantially similar to any of the exterior fins disclosed herein. In an embodiment, at least one of the interior surface 1218 of the first support structure 1202A or the interior surface of the second support structure 1202B can include a plurality of interior fins 1250. At least one feature of the plurality of interior fins 1250 can be the same as or substantially similar to at least one feature of any of the interior fins disclosed herein. In an embodiment, as shown, at least one of the exterior fins 1248 or the interior fins 1250 can extend in a circumferential direction. In an embodiment, at least one of the exterior fins 1248 or the interior fins 1250 can extend in an axial direction.

The exterior fins 1248 and/or the interior fins 1250 may facilitate heat removal from the first and second support structures 1202A, 1202B. For example, the first and second superhard bearing elements 1208A, 1208B may transfer heat to the first and second support structures 1202A, 1202B, respectively. The heat transferred into the first and second support structures 1202A, 1202B, if not dissipated, may damage the first and second support structures 1202A, 1202B and/or prevent the first and second superhard bearing elements 1208A, 1208B from transferring heat into the first and second support structures 1202A, 1202B. The exterior fins 1248 and/or the interior fins 1250 may increase heat dissipation from the first and second support structures 1202A, 1202B during operation thereby at least one of limiting damage to the first and second support structures 1202A, 1202B or increasing the heat transferred from the first and second superhard bearing elements 1208A, 1208B into the first and second support structures 1202A, 1202B, respectively.

While various aspects and embodiments have been disclosed herein, other aspects and embodiments are contemplated. The various aspects and embodiment disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
    a support structure having a first end and a second end, the support structure defining a support structure conduit extending from the second end to the first end; and
    a superhard bearing element secured to the support structure, the superhard bearing element including:
        an at least partially leached polycrystalline diamond table defining a superhard sealing surface configured to reduce an amount of fluid from leaking between the superhard sealing surface and a surface on which the superhard sealing surface is configured to bear as compared to another surface of the superhard bearing element, the at least partially leached polycrystalline diamond table including a leached region extending inwardly from the superhard sealing surface;
        a base surface;
        at least one lateral surface extending between the superhard sealing surface and the base surface; and
        at least one interior surface extending between the superhard sealing surface to the base surface, the at least one interior surface defining a bearing element conduit coupled to the support structure conduit, wherein the superhard bearing element further includes an interior chamfer extending from the at least one interior surface to the superhard sealing surface.

2. The bearing assembly of claim 1, wherein the support structure defines a recess at the first end thereof and the superhard bearing element is at least partially disposed in the recess.

3. The bearing assembly of claim 2, wherein the superhard bearing element is press fit in the recess or brazed in the recess.

4. The bearing assembly of claim 1, wherein the superhard sealing surface exhibits a surface roughness, in root mean square, of 5 μm to 40 μm.

5. The bearing assembly of claim 1, wherein the leached region extends inwardly from the superhard sealing surface to a depth of 20 μm to 600 μm.

6. The bearing assembly of claim 1, wherein the leached region extends inwardly from at least a portion of the at least one interior surface.

7. The bearing assembly of claim 1, further comprising a plurality of exterior fins that are separated from each other by a plurality of grooves formed in at least one of the at least one lateral surface, the at least one interior surface, or the support structure.

8. The bearing assembly of claim 1, further comprising a plurality of exterior fins that are coupled to the at least one lateral surface.

9. The bearing assembly of claim 8, wherein the plurality of exterior fins include polycrystalline diamond.

10. The bearing assembly of claim 8, wherein the plurality of exterior fins are substantially diamond free.

11. A bearing assembly, comprising:
a support structure having a first end and a second end, the support structure defining a support structure conduit extending from the second end to the first end; and
a superhard bearing element secured to the support structure, the superhard bearing element including:
an at least partially leached polycrystalline diamond table defining a superhard sealing surface configured to reduce an amount of fluid from leaking between the superhard sealing surface and a surface on which the superhard sealing surface is configured to bear as compared to another surface of the superhard bearing element, the at least partially leached polycrystalline diamond table including a leached region extending inwardly from the superhard sealing surface;
a base surface;
at least one lateral surface extending between the superhard sealing surface and the base surface; and
at least one interior surface extending between the superhard sealing surface to the base surface, the at least one interior surface defining a bearing element conduit coupled to the support structure conduit, wherein the superhard bearing element includes a plurality of interior fins separated from each other by a plurality of grooves formed in the at least one interior surface and/or coupled to at least a portion of the at least one interior surface.

12. A bearing assembly, comprising:
a support structure having a first end and a second end, the support structure defining a support structure conduit extending from the second end to the first end; and
a superhard bearing element secured to the support structure, the superhard bearing element including:
an at least partially leached polycrystalline diamond table defining a superhard sealing surface, the at least partially leached polycrystalline diamond table including a leached region extending inwardly from the superhard sealing surface;
a base surface;
at least one lateral surface extending between the superhard sealing surface and the base surface; and
at least one interior surface extending between the superhard sealing surface to the base surface, the at least one interior surface defining a bearing element conduit coupled to the support structure conduit, the superhard sealing surface configured to at least partially prevent fluid traveling through the bearing element conduit within the superhard bearing element from leaking to an exterior portion of the superhard bearing element, wherein:
the support structure defines at least one additional support structure conduit extending from the base surface; and
the superhard bearing element includes at least one additional bearing element conduit that is coupled to the at least one additional support structure conduit.

13. A bearing assembly, comprising:
a support structure having a first end and a second end, the support structure defining a support structure conduit extending from the second end to the first end, the support structure defining a recess at the first end thereof; and
a superhard bearing element at least partially disposed in and press-fit or brazed in the recess, the superhard bearing element including:
a superhard sealing surface;
a base surface;
at least one lateral surface extending between the superhard sealing surface and the base surface; and
at least one interior surface extending between the superhard sealing surface to the base surface, the at least one interior surface defining a bearing element conduit coupled to the support structure conduit, the superhard sealing surface configured to at least partially prevent fluid traveling through the bearing element conduit within the superhard bearing element from leaking to an exterior portion of the superhard bearing element, wherein:
the superhard sealing surface exhibits a surface roughness, in root mean square, of 5 μm to 40 μm:
the superhard bearing element includes a plurality of interior fins separated from each other by a plurality of grooves formed in the at least one interior surface and/or coupled to at least a portion of the at least one interior surface: or
the superhard bearing element further includes an interior chamfer extending from the at least one interior surface to the superhard sealing surface.

14. The bearing assembly of claim 13, wherein the superhard bearing element includes a polycrystalline diamond table defining the superhard sealing surface, the polycrystalline diamond table including a plurality of bonded diamond grains defining a plurality of interstitial regions.

15. The bearing assembly of claim 13, further comprising a plurality of exterior fins that are separated from each other by a plurality of grooves formed in the at least one lateral surface.

16. The bearing assembly of claim 13, further comprising a plurality of exterior fins that are coupled to the at least one lateral surface.

17. The bearing assembly of claim 13, wherein:
the support structure defines at least one additional support structure conduit extending from the base surface; and
the superhard bearing element includes at least one additional interior surface defining at least one additional bearing element conduit coupled to the at least one additional support structure conduit.

18. A bearing assembly, comprising:
a support structure having a first end and a second end, the support structure defining a support structure conduit extending from the second end to the first end; and
a superhard bearing element secured to the support structure, the superhard bearing element including:
a superhard sealing surface defined by a coating applied to at least a portion of the superhard bearing element;
a base surface;
at least one lateral surface extending between the superhard sealing surface and the base surface; and
at least one interior surface extending between the superhard sealing surface to the base surface, the at least one interior surface defining a bearing element conduit coupled to the support structure conduit, the coating configured to at least partially prevent fluid traveling through the bearing element conduit within the superhard bearing element from leaking to an exterior portion of the superhard bearing element.

19. The bearing assembly of claim 18, wherein the superhard sealing surface exhibits a surface roughness, in root mean square, of 5 µm to 40 µm.

20. The bearing assembly of claim 18, wherein:
- the support structure defines at least one additional support structure conduit extending from the base surface; and
- the superhard bearing element includes at least one additional interior surface defining at least one additional bearing element conduit coupled to the at least one additional support structure conduit.

* * * * *